United States Patent
Takahashi (12)

(10) Patent No.: US 6,249,833 B1
(45) Date of Patent: Jun. 19, 2001

(54) DUAL BUS PROCESSING APPARATUS WHEREIN SECOND CONTROL MEANS REQUEST ACCESS OF FIRST DATA BUS FROM FIRST CONTROL MEANS WHILE OCCUPYING SECOND DATA BUS

(75) Inventor: Junichi Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/218,443

(22) Filed: Dec. 22, 1998

(30) Foreign Application Priority Data

Dec. 22, 1997 (JP) .................................................. 9-365909

(51) Int. Cl.[7] .................................................. G06F 13/00
(52) U.S. Cl. .......................... 710/128; 710/27; 710/100; 710/107
(58) Field of Search .............................. 710/27, 100, 107, 710/128

(56) References Cited

U.S. PATENT DOCUMENTS

| | | | |
|---|---|---|---|
| 4,456,965 | * 6/1984 | Graber et al. | 710/128 |
| 4,912,636 | 3/1990 | Magar et al. | 710/111 |
| 5,345,566 | * 9/1994 | Tanji et al. | 710/128 |
| 5,495,585 | * 2/1996 | Datwyler et al. | 710/100 |
| 6,115,767 | * 9/2000 | Hashimoto et al. | 710/107 |

FOREIGN PATENT DOCUMENTS

| | | |
|---|---|---|
| 56-153422 | 11/1981 | (JP) . |
| 64-31251 | 2/1989 | (JP) . |
| 2-163862 | 6/1990 | (JP) . |
| 5-128279 | 5/1993 | (JP) . |
| 5-274250 | 10/1993 | (JP) . |
| 5-332844 | 12/1993 | (JP) . |
| 6-60015 | 3/1994 | (JP) . |
| 7-302251 | 11/1995 | (JP) . |
| 7-302253 | 11/1995 | (JP) . |
| 9-44442 | 2/1997 | (JP) . |
| 9-223103 | 8/1997 | (JP) . |

\* cited by examiner

*Primary Examiner*—Thomas Lee
*Assistant Examiner*—Tammara Peyton
(74) *Attorney, Agent, or Firm*—Foley & Lardner

(57) ABSTRACT

In an information processing apparatus equipped with a CPU, an operating rate of this CPU is increased so as to increase a throughput of this entire information processing apparatus. The information processing apparatus is arranged by first and second internal buses independently provided from each other, an internal memory connected to the first internal bus, and a timer 25 connected to the second internal bus. Furthermore, this information processing apparatus is arranged by an A/D converter, first/second serial interfaces, the CPU, and a DMAC (direct memory access controller). Both the CPU and the DMAC control data input/output operations in the internal memory and the timer while occupying at least one of these fist/second data buses. The DMAC supplies a request signal to such a CPU for controlling the data input/output operation of the internal memory while occupying at least one of the first/second internal buses, and also controls the data input/output operations in the internal memory in response to an acknowledge signal supplied from the CPU while occupying either one or both the first/second internal buses.

46 Claims, 22 Drawing Sheets

| BREQ₀ | BREQ₁ | BREQ₂ | BREQ₃ | channel number |
|---|---|---|---|---|
| 1 | * | * | * | 0 |
| 0 | 1 | * | * | 1 |
| 0 | 0 | 1 | * | 2 |
| 0 | 0 | 0 | 1 | 3 |

* : don't care

DUAL BUS PROCESSING APPARATUS WHEREIN SECOND CONTROL MEANS REQUEST ACCESS OF FIRST DATA BUS FROM FIRST CONTROL MEANS WHILE OCCUPYING SECOND DATA BUS

BACKGROUND OF THE INVENTION

1. Field of the Invention

The present invention generally relates to an information processing method and an information processing apparatus. More specifically, the present invention is directed to such an information processing method/apparatus capable of increasing a throughput of this information processing apparatus equipped with a CPU, a memory, a plurality of input/output(I/O) devices, a direct memory access controller (DMAC), and at least two buses, while effectively utilizing these buses.

2. Description of the Related Art

Conventionally, information processing apparatuses are known in the technical field. For instance, one conventional information processing apparatus as described in Japanese Patent Laid-open Application No. Hei5-274250 published in 1993 is schematically shown in FIG. 27.

This conventional information processing apparatus is mainly arranged by the one-chip microcomputer 1, the direct memory access controller (DMAC) 2, the input/output (I/O) device 3, and the external memory 4. These structural elements are connected via the external bus 5 to each other. This one-chip microcomputer 1 is constructed in such a manner that the central processing unit (CPU) 6, the internal memory 7, the bus arbiter 8, and the internal (data) bus 9 are manufactured on a single semiconductor chip. The CPU 6, the internal memory 7, and the bus arbiter 8 are connected via the internal bus 9 to each other. The CPU 6 contains the bus controller 10 for controlling the connection/disconnection between the internal bus 9 and the CPU 6. The bus controller 10 enters therein to the request signal from the bus arbiter 8, and supplies the acknowledge signal to this bus arbiter 8. This request signal indicates that the bus arbiter 8 requests to release the internal bus 9. The acknowledge signal indicates that the bus arbiter 8 is allowed to release the internal bus 9.

The bus arbiter 8 is connected with the internal bus 9 and the external bus 5. The external request for requesting releasing of both the external bus 5 and the internal bus 9 is inputted from the DMAC 2 into this bus arbiter 8. Also, this bus arbiter 8 supplies the external acknowledge signal for allowing releasing of both the external bus 5 and the internal bus 9 to the DMAC 2. The bus arbiter 8 may release only the external bus 5 while isolating the connection between the internal bus 9 and the external bus 5 with respect to the DMAC 2 in response to the state of the mode selection bit 11. Also, the bus arbiter 8 may release any of the internal bus 9 and the external bus 5 under such a condition that the external bus 5 is connected to the internal bus 9. The state of the mode selection bit 11 is rewritable in accordance with the programs supplied from the CPU 6 and the DMAC 2. The bus arbiter 8 supplies the retry signal to the bus controller 10 of the CPU 6. This retry signal is used to retry the bus cycle of the CPU 6 while the DMAC 2 occupies the external bus 5, and the data transfer to the I/O device 3 or the external memory 4 is set to write state.

With employment of such an arrangement, in the conventional information processing apparatus, even when the program is being executed, the bus arbiter causes the operating states of the DMAC 2 to be transferred by rewriting the mode selection bit 11 and also supplying the external request signal from the DMAC 2 to the bus arbiter 8. As a result, both the CPU 6 and the DMAC 2 can use their data buses in parallel, so that the operating rate of the CPU 6 is increased and therefore the overall throughput is increased. These operating states contain the first to third states. In the first state, none of the external bus 5 and the internal bus 9 is released. In the second state, while the external bus 5 and the internal bus 9 are connected, any one of these data buses is released. In the third state, only the external bus 5 is released. The bus arbiter 8 transfers the first state into the second state, or the third state. The bus arbiter 8 transfers either the second state or the third state into the first state. Otherwise, the bus arbiter 8 transfers the second state into the third state.

In the above-described conventional information processing apparatus, under the third condition where the bus arbiter 8 disconnects the connection between the external bus 5 and the internal bus 9, the CPU 6 and the DMAC 2 can use the internal bus 9 and the external bus 5 respectively inside and also outside the one-chip microcomputer 1.

However, under the first state and the second state where the bus arbiter 8 connects the external bus 5 in series to the internal bus 9, either the CPU 6 or the DMAC 2 occupies both the external bus 5 and the internal bus 9 at the same time. As a consequence, the following simultaneous process operations cannot be carried out. For example, while the CPU 6 reads the data stored in the external memory 4, the DMAC 2 transfers the data stored in the internal memory 7 to the I/O device 3.

In such a case, either the CPU 6 or the DMAC 2 must interrupt the above-described process operations.

As a result, the conventional information has such a drawback. That is, there is a limitation in increasing of the operating rate of this CPU 6, namely improvement in the throughput of the overall conventional information processing apparatus. This drawback could not be solved even when all of the structural elements shown in FIG. 27 are manufactured in an one-chip structure as disclosed in the above-described Japanese Patent Laid-open Application.

SUMMARY OF THE INVENTION

The present invention has been made to solve the above-described drawbacks, and therefore, has an object to provide an information processing apparatus and an information processing method, capable of increasing an operating rate of a CPU, and further capable of increasing a throughput of the overall information processing system.

To achieve the above-described objects, an information processing apparatus, according to a first aspect of the present invention, is featured by comprising:

at least first and second data buses provided independently from each other;

a plurality of input/output means connected to at least one of the first and second buses, for inputting/outputting data, first control means for controlling the data input/output operations of the input/output means while occupying at least the first data bus; and second control means for requesting the first control means which controls the data input/output operations of the input/output means while occupying at least the first data bus to release the occupied first data bus, and also for controlling the data input/output operations of the input/output means while occupying the second data bus, or both the first and second data buses in response to releasing of the first data bus by the first control means.

Also, to achieve the above-explained object, an information processing apparatus, according to a second aspect of the present invention, is featured by comprising:

at least first and second data buses provided independently from each other;

a plurality of input/output means connected to at least one of the first and second buses, for inputting/outputting data, first control means for controlling the data input/output operations of the input/output means while occupying at least the first data bus; and second control means for requesting the first control means to release the occupied first data bus, and also for controlling the data input/output operations of the input/output means while occupying at least the second data bus, in response to releasing of the first data bus by the first control means; wherein:

the first control means releases the first data bus requested to be released based upon the releasing request of the first data bus issued from the second control means and also an operating condition of the own first control means.

In the information processing apparatus according to the first, or second aspect of the present invention, the first and second data buses, the plurality of input/output means, and the first and second control means are manufactured on a single chip in the form of an one-chip microcomputer.

Furthermore, priority orders are preset to the data input/output operations of the plural input/output means; and in response to the preset priority orders, the second control means requests the first control means to release at least the first data bus occupied by the first control means, and also controls the data input/output operations of the plural input/output means while occupying the second data bus in response to releasing of the first data bus by the first control means.

Also, when the first control means controls the data input/output operations of the input/output means while occupying at least the first data bus, and also causes the second control means to control the data input/output operations of the input/output means while occupying at least the second data bus, the first control means supplies information related to a data input/output control to be executed in the input/output means to the second control means; and the second control means requests the first control means to release at least the first data bus based upon the supplied information, and also controls the data input/output operations of the input/output means while occupying at least the second data bus based upon releasing of the first data bus by the first control means.

Also, in response to one of requests issued from the input/output means to which data is required to be inputted/outputted, a computer program, and an external source, the second control means requests the first control means to release at least the first data bus; and also controls the data input/output operations of the input/output means while occupying at least the second data bus based on releasing of the first data bus by the first control means.

Further, one of the first control means and the second control means requests the other of the first control means and the second control means to release a portion of at least one of the first and second data buses; and also controls the data input/output operations of the input/output means while occupying the portion of at least one of the first and second data buses based upon releasing of the portion of at least one of the first and second data buses by the other of the first control means and the second control means.

The information processing apparatus, according to the first, or second aspect of the present invention, is further comprised of: bus connecting means connected to at least the first and second data buses, whereby the plurality of input/output means are connected via the bus connecting means to any one of the first and second data buses under control of the bus connecting means by one of the first and second control means so as to input/output the data.

Also, the first control means and the second control means are arranged by a CPU (central processing unit) and a DMAC (direct memory access controller).

Moreover, the DMAC includes:

a channel control unit connected to the CPU;

a data control unit connected to the first and second data buses;

an address control unit connected to the first and second data buses; and a DMA control register connected to the channel control unit.

Also, the plurality of input/output means includes at least a timer, an A/D converter, and a serial interface.

The information processing apparatus, according to the first, or second aspect of the present invention, is further comprised of: an internal memory connected to the first and second data buses, for storing the data under control of the first and second control means.

To achieve the above-described objects, an information processing apparatus, according to a third aspect of the present invention, is featured by comprising:

at least first and second internal data buses provided independently from each other;

at least one external data bus;

a plurality of internal input/output means connected to at least one of the first and second internal data buses, for inputting/outputting data;

a plurality of external input/output means connected to at least the one external data bus, for inputting/outputting data;

first control means for controlling the data input/output operations of the internal input/output means while occupying at least the first internal data bus; and second control means for requesting the first control means which controls the data input/output operations of the internal input/output means while occupying at least the first internal data bus to release the occupied first data bus, and also for controlling the data input/output operations of the internal input/output means while occupying the second internal data bus, or both the first and second internal data buses in response to releasing of the first internal data bus by the first control means, and based upon occupation conditions of the external data bus.

To achieve the above-described objects, an information processing apparatus, according to a fourth aspect of the present invention, is featured by comprising:

at least first and second internal data buses provided independently from each other;

at least one external data bus;

a plurality of internal input/output means connected to at least one of the first and second internal data buses, for inputting/outputting data;

a plurality of external input/output means connected to at least the one external data bus, for inputting/outputting data;

first control means for controlling the data input/output operations of the internal input/output means while occupying at least the first internal data bus;

second control means for requesting the first control means to release the occupied first internal data bus, and also for controlling the data input/output operations of the input/output means while occupying the second internal data bus in response to releasing of the first internal data bus by the first control means, and based upon occupation conditions of the external data bus; wherein:

the first control means releases the first internal data bus requested to be released based upon the releasing request from the second control means and also an operating condition of the own first control means.

In the information processing apparatus according to the third, or fourth aspect of the present invention, the first and second internal data buses, the plurality of internal input/output means, the first and second control means, and at least an external bus controller are manufactured on a single chip in the form of an one-chip microcomputer.

Also, priority orders are preset to the data input/output operations of the plural internal input/output means; and in response to the preset priority orders, the second control means requests the first control means to release at least the first internal data bus occupied by the first control means, and also controls the data input/output operations of the plural internal input/output means while occupying the second internal data bus in response to releasing of the first internal data bus by the first control means.

Also, when the first control means controls the data input/output operations of the internal input/output means while occupying at least the first internal data bus, and also causes the second control means to control the data input/output operations of the internal input/output means while occupying at least the second internal data bus, the first control means supplies information related to data input/output control to be executed in the internal input/output means to the second control means; and the second control means requests the first control means to release at least the first internal data bus based upon the supplied information, and also controls the data input/output operations of the internal input/output means while occupying at least the second internal data bus based upon releasing of the first internal data bus by the first control means.

Furthermore, in response to one of requests issued from the internal and external input/output means to which data is required to be inputted/outputted, a computer program, and an external source, the second control means requests the first control means to release at least the first internal data bus; and also controls the data input/output operations of the internal input/output means while occupying at least the second data bus based on releasing of the first internal data bus by the first control means.

Further, one of the first control means and the second control means requests the other of the first control means and the second control means to release a portion of at least one of the first and second internal data buses; and also controls the data input/output operations of the internal input/output means while occupying the portion of at least one of the first and second internal data buses based upon releasing of the portion of at least one of the first and second internal data buses by the other of the first control means and the second control means.

The information processing apparatus, according to the third, or fourth aspect of the present invention, is further comprised of: bus connecting means connected to at least the first and second internal data buses, whereby the plurality of internal input/output means are connected via the bus connecting means to any one of the first and second internal data buses under control of the bus connecting means by one of the first and second control means so as to input/output the data.

Also, the first control means and the second control means are arranged by a CPU (central processing unit) and a DMAC (direct memory access controller).

Furthermore, the DMAC includes:

a channel control unit connected to the CPU;

a data control unit connected to the first and second internal data buses;

an address control unit connected to the first and second internal data buses; and a DMA control register connected to the channel control unit.

Moreover, the plurality of internal input/output means includes at least a timer, an A/D converter, and a serial interface.

The information processing apparatus, according to the third, or fourth aspect of the present invention, is further comprised of: an internal memory connected to the first and second internal data buses, for storing the data under control of the first and second control means.

In addition, an information processing method, according to a fifth aspect of the present invention, is featured by comprising:

a first control step for controlling data input/output operations executed by a plurality of input/output means under control of first control means, connected to at least one of first and second data buses while occupying at least the first data bus;

a second control step for requesting the first control means to release the second data bus under control of second control means, which is not occupied in the first control step where the data input/output operations by the plural input/output means are controlled while occupying the first data bus;

a third control step for judging as to whether or not the second control means releases the second data bus not occupied by the own second control means based upon the request and operating conditions of the own second control means, and thereafter for notifying the judgment result to the first control means; and a fourth control step for controlling the data input/output operations of the plural input/output means under control of the first control means based on the notification issued from the second control means while occupying the second data bus not occupied by the second control means.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Referring to drawings, various preferred embodiments of the present invention will be described in detail.

OVERALL ARRANGEMENT OF FIRST INFORMATION PROCESSING APPARATUS

Figure 1:
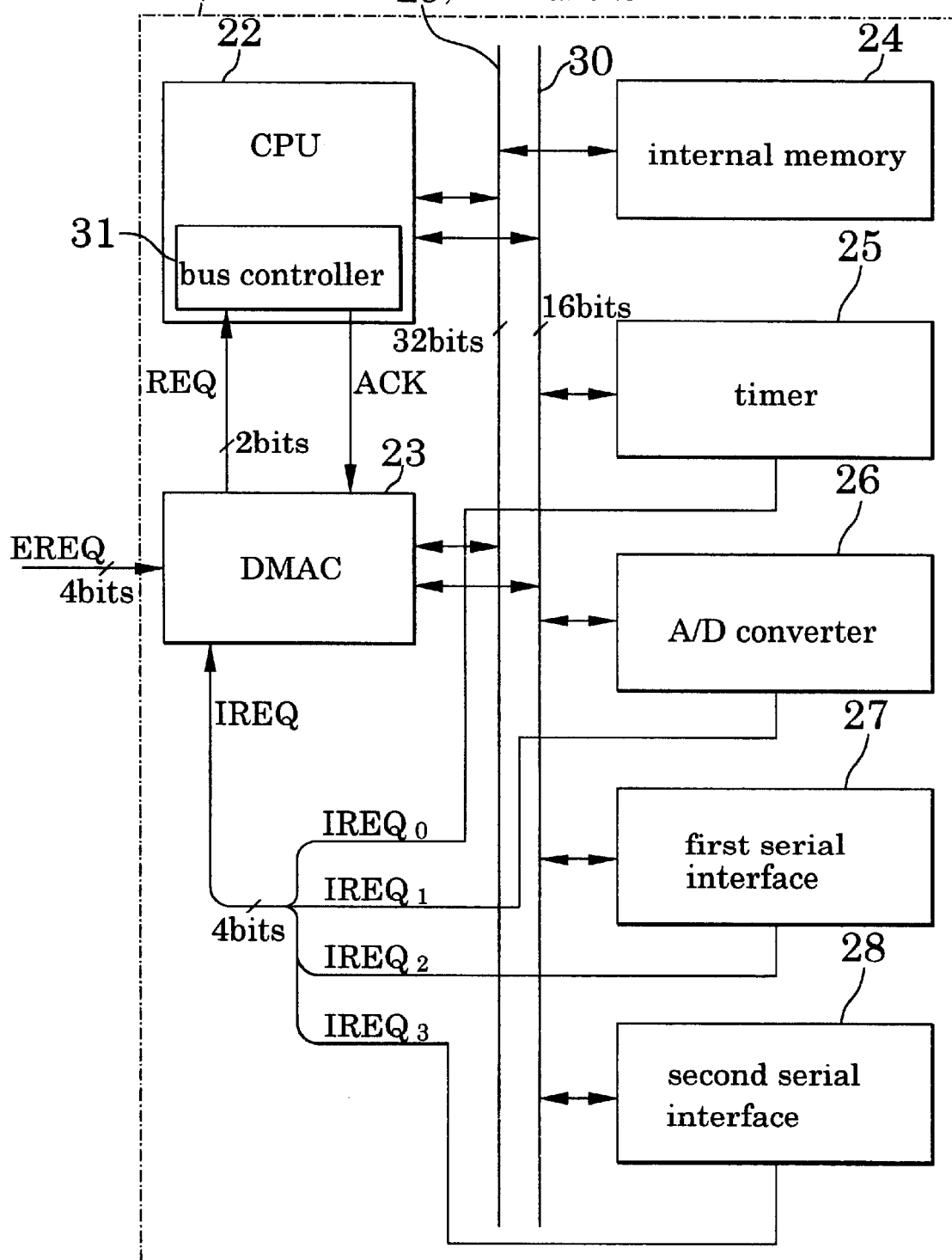
FIG. 1 is a schematic block diagram for representing an internal arrangement of an information processing apparatus according to a first embodiment of the present invention.
Figure 2:
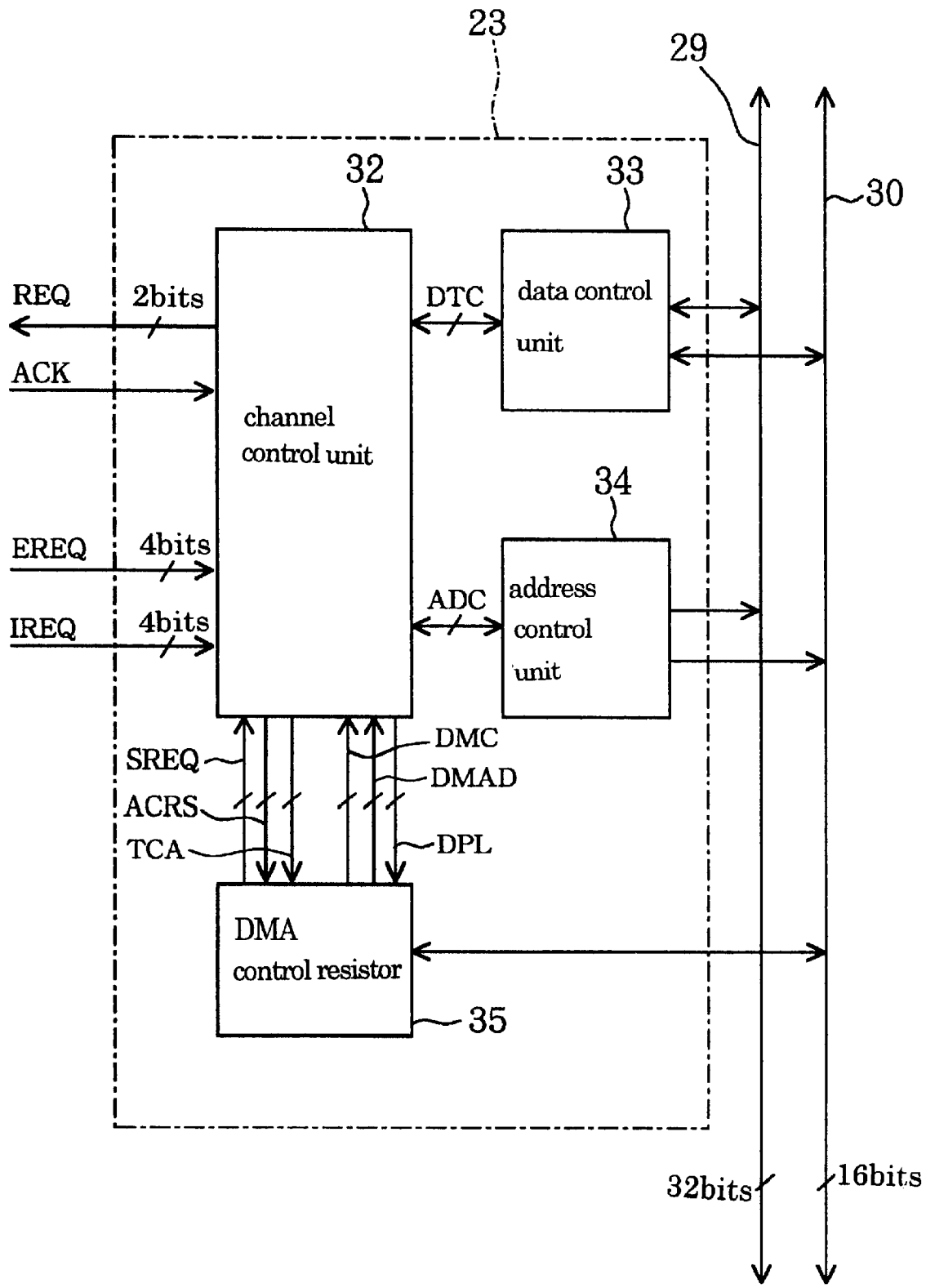
FIG. 2 is a schematic block diagram for showing an internal arrangement of a DMAC (direct memory access controller) employed in the first information processing apparatus shown in FIG. 1.

FIG. 1 is a schematic block diagram for indicating an overall arrangement of an information processing apparatus 21 according to a first embodiment of the present invention.

As indicated in this drawing, this first information processing apparatus 21 is arranged by a CPU (central processing unit) 22, a DMAC (direct memory access controller) 23, an internal memory 24, a timer 25, an A/D (analog-to-digital) converter 26, first and second serial interfaces 27/28, and also two internal buses 29/30. These structural elements are manufactured on an one semiconductor chip, namely a single-chip microcomputer. The CPU 22, the DMAC 23, and the internal memory 24 are connected to each other via the internal bus 29 through which 32-bit data can be transferred, whereas the CPU 22, the DMAC 23, the timer 25, the A/D converter 26, and the first/second serial interfaces 27/28 are connected to each other via the internal bus 30 through which 16-bit data can be transferred.

The CPU 22 controls circuit connections/disconnections with these internal buses 29/30, and contains a bus controller 31. The signals for fetching/releasing the internal buses 29/30 are supplied/derived to/from these internal buses 29/30. This bus controller 31 judges as to whether or not either one or both the internal buses 29/30 are allowed to be released based upon a 2-bit request signal "REQ" sent from the DMAC 23 and an operation condition of the CPU 22. This 2-bit request signal indicates a request for releasing either one or both the internal buses 29/30. Then, the bus controller 31 supplies an acknowledge signal "ACK" indicative of this judgement result to the DMAC 23.

Now, a description is made of a relationship between a value of the request signal REQ and the internal buses 29/30 to be released. In this first embodiment, when the value of the request signal REQ becomes "00", this request signal requests that both the internal buses 29 and 30 are not released. Similarly, when the value of the request signal REQ becomes "01", this request signal requests that only the internal bus 29 is released. When the value of the request signal REQ becomes "10", this request signal requests that only the internal bus 30 is released. When the value of the request signal REQ becomes "11", this request signal requests that both the internal buses 29 and 30 are released.

In response to a 4-bit internal request signal IREQ, and a 4-bit external request signal EREQ and the like, the DMAC 23 produces the above-described request signal REQ and then supplies this produced request signal REQ to the bus controller 31. The 4-bit internal request signal IREQ is constituted by internal request signals $IREQ_0$ to $IREQ_3$ for requesting a release of the internal buses 29 and 30, and these internal request signals are supplied from the four I/O devices such as the timer 25. The 4-bit external request signal EREQ indicates that the internal buses 29 and 30 are requested to be released, and is supplied from an external signal source. Also, since an acknowledge signal ACK is supplied from the bus controller 31 to the DMAC 23, this DMAC 23 controls DMA-transfer operations of data among these I/O devices such as the internal memory 24 and the timer 25, or DMA-transfer operations of data among the respective addresses of the internal memory 24.

It should be noted that bus controllers are provided in the I/O devices such as the internal memory 24 and the timer 25. The bus controllers control to connect/disconnect between either the internal bus 29 or the internal bus 30 and the respective I/O devices. When the value of the request signal REQ becomes "00", the CPU 22 controls all of the bus controllers. When the value of the request signal REQ becomes any values other than "00", the DMAC 23 controls all of the bus controllers including the bus controller 31 employed in the CPU 22.

INTERNAL ARRANGEMENT OF DMAC

An internal arrangement of the above-described DMAC 23 will then be explained with reference to FIG. 2 to FIG. 7. The DMAC 23 is mainly arranged by a channel control unit 32, a data control unit 33, an address control unit 34, and a DMA control register 35.

Figures 3, 4:
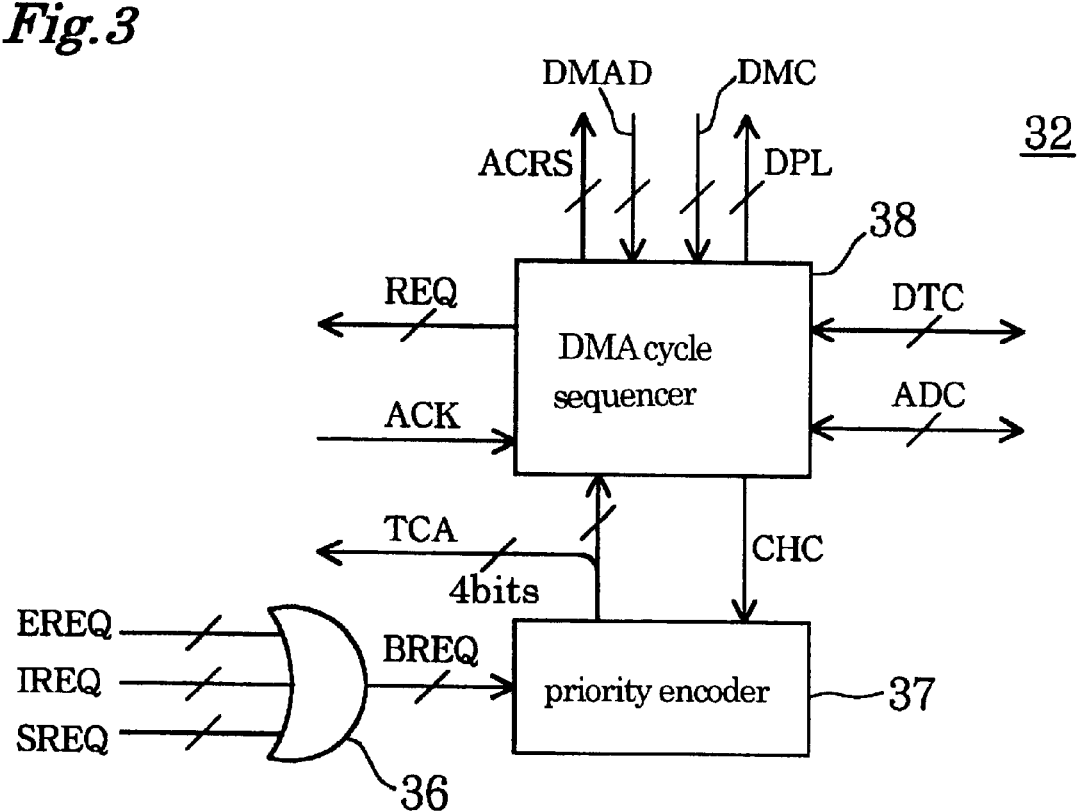
FIG. 3 is a schematic block diagram for indicating an internal arrangement of a channel control unit employed in the first information processing apparatus.
FIG. 4 represents a relationship between the respective bits $BREQ_0$ to $BREQ_3$ of a bus request signal entered into a priority encoder and numbers of 4 channels for constituting a DMA control register in the first information processing apparatus.

As indicated in FIG. 3, the channel control unit 32 is mainly arranged by an OR gate 36, a priority encoder 37, and a DMA cycle sequencer 38.

The 4-bit internal request signal IREQ, the 4-bit external request signal EREQ, and further a 4-bit software request signal SREQ supplied from the DMA control register 33 are entered into this OR gate 36. The OR gate 36 OR-gates these input signals to produce a 4-bit bus request signal BREQ which will be supplied to the priority encoder 37.

Based upon the bus request signal BREQ supplied from the OR gate 36, the priority encoder 37 produces a 4-bit channel validity signal TCA and supplies this 4-bit channel validity signal TCA to both the DMA control register 35 and the DMA cycle sequencer 38. The respective bits $TCA_0$ to $TCA_3$ of this 4-bit channel validity signal TCA are produced by substituting the respective bits $BREQ_0$ to $BREQ_3$ of the bus request signal BREQ for the below-mentioned formulae (1) to (4), since such a relationship shown in FIG. 4 can be established between the respective bits $BREQ_0$ to $BREQ_3$ of the bus request signal BREQ, and numbers of 4 channels which constitute the DMA control register 35 (will be discussed later):

$$TCA_0 = BREQ_0 \qquad (1)$$

$$TCA_1 = (/BREQ_0)BREQ_1 \qquad (2)$$

$$TCA_2 = (/BREQ_0)(/BREQ_1)BREQ_2 \qquad (3)$$

$$TCA_3 = (/BREQ_0)(/BREQ_1)(/BREQ_2)BREQ_3 \qquad (4)$$

In the above-described formulae (1) to (4), such a bit to which symbol "/" is not given implies a value of "1", namely under active state, whereas such a bit to which symbol "/" is given implies a value of "0", namely under non-active state.

The channel validity signal TCA may be invalidated by a channel clear signal CHC supplied from the DMA cycle sequencer 38. It should be noted that a term "priority order" implies a channel priority order among a zero-th channel 43 to a third channel 46. The zero-th channel 43 owns the highest priority order, the first channel 44 and the second channel 45 own the priority orders lower than the highest priority order, and the third channel 46 owns the lowest priority order. As a consequence, there are no priority orders among the internal request signal IREQ, the external request signal EREQ, and the software transfer request signal SREQ. That is, a first signal owns a top priority order. Alternatively, priority orders may be set among these signals with respect to each of these channels.

When the channel validity signal TCA is inputted into the DMA cycle sequencer 38, this DMA cycle sequencer 38 supplies a 3-bit address counter read strobe ACRS to the DMA control register 35 so as to receive the supply of a 16-bit DMA address signal DMAD and the supply of a 16-bit DMA control signal DMC from the channel of the DMA control register 35 which is validated by the channel validity signal TCA. In response to the contents of the respective DMA address signal and DMA control signal, the DMAC 23 initiates the DMA cycle for performing the various controls. The 3-bit address counter read strobe ACRS is used to apply read/write timing signals to a source address register, a destination address register, and a byte count register, which constitute the respective channels of the DMA control register 35 (will be discussed later). The DMA address signal DMAD is constituted by a source address SAD, a destination address DAD, a byte count value BC and so on. The source address SAD indicates the relevant address on the memory map of the I/O device (Will be referred to as a "source" hereinafter) such as the internal memory 24 and the timer 25, which corresponds to a data transfer source. The destination address DAD indicates the relevant address on the memory map of the I/O device (will be referred to as a "destination" hereinafter) such as the internal memory 24 and the timer 25, which corresponds to a data transfer destination. The DMA control signal DMC is constructed of a value "β" to be subtracted from the byte count value BC, and a displacement value "α" and the like. This displacement value "α" indicates how many bytes of the source address SAD and of the destination address DAD should be updated every time the DMA transfer operation is carried out one time. When 8-bit data is transferred, this displacement value "α" becomes 1, whereas when 16-bit data is transferred, this displacement value "α" becomes 2. When 32-bit data is transferred, this displacement value "α" becomes 4.

The DMA cycle sequences 38 decodes both the source address SAD and the destination address DAD indicated by the DMA address signal DMAD so as to judge which DMA transfer operation is carried out. Then, this DMA cycle sequencer 38 outputs such a request signal REQ responding to this judgement by way of the DMA cycle (namely, either 2 cycle transfer or fly by transfer) indicated by the DMA control signal DMC to the bus controller 31 of the CPU 22. Then, when an acknowledge signal ACK is supplied from the bus controller 31, the DMA cycle sequencer 38 produces a data control signal DTC and an address control signal ADC. The data control signal DTC instructs the data input/output to the internal buses 29 and 30. The address control signal instructs the address output to the internal buses 29 and 30. The DMA cycle sequencer 38 supplies the produced data control signal DTC and the produced address control signal ADC to the data control unit 33 and the address control unit 34, respectively.

In this embodiment, the term "2 cycle transfer" implies such a data transfer mode that 2 bus cycles occur, namely 1 cycle during which the data to be transferred is read from the source, and 1 cycle during which the read data is written into the destination. The term "fly by transfer" implies such a data transfer mode that in general, this flyby transfer is used to transfer the data between the internal memory 24 and the external I/O device, and the DMA transfer is accomplished within 1 bus cycle.

Also, the DMA cycle sequencer 38 supplies both the displacement value "α" and the value "β" to be subtracted from the byte count value BC as a displacement signal DPL to the DMA control register 35.

INTERNAL ARRANGEMENT OF DATA CONTROL UNIT

Figure 5:
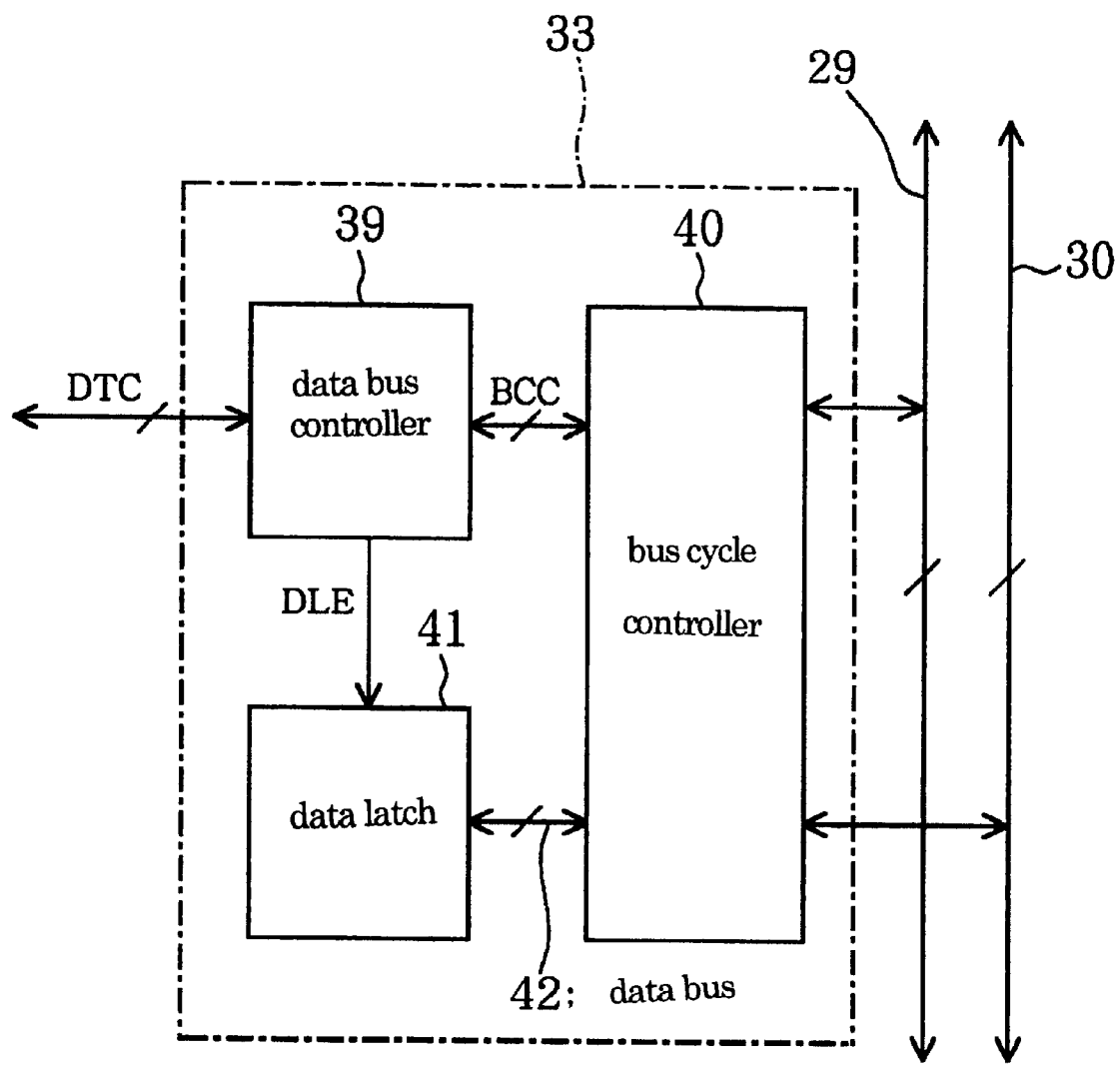
FIG. 5 is a schematic block diagram for showing an internal arrangement of a data control unit employed in the first information processing apparatus.

As indicated in FIG. 5, the data control unit 33 is mainly arranged by a data bus controller 39, a data latch 41, and a bus cycle controller 40.

In response to the data control signal DTC, the data bus controller 39 produces a bus cycle control signal BCC and a data latch enable DLE and then supplies this bus cycle control signal BCC to the bus cycle controller 40 and the data latch 41. In response to the bus cycle control signal BCC supplied from the data bus controller 39, the bus cycle controller 40 initiates the bus cycle with respect to any one, or all of the internal bus 29 and the internal bus 30 so as to supply the data entered from any one of the internal bus 29 and the internal bus 30 via a data bus 42 to the data latch 41. Furthermore, this bus cycle controller 39 enters therein to the data latched by the data latch 41 through the data bus 42, and then outputs this entered data to any one of the internal bus 29 and the internal bus 30. The data latch 41 latches the data which is supplied from the bus cycle controller 40 via the data bus 42 in response to the data latch enable DLE supplied from the data bus controller 39.

The address control unit 34 outputs an address to the internal buses 29 and 30 in response to the address control signal ADC supplied from the channel control unit 32.

INTERNAL ARRANGEMENT OF DMA CONTROL REGISTER

Figure 6:
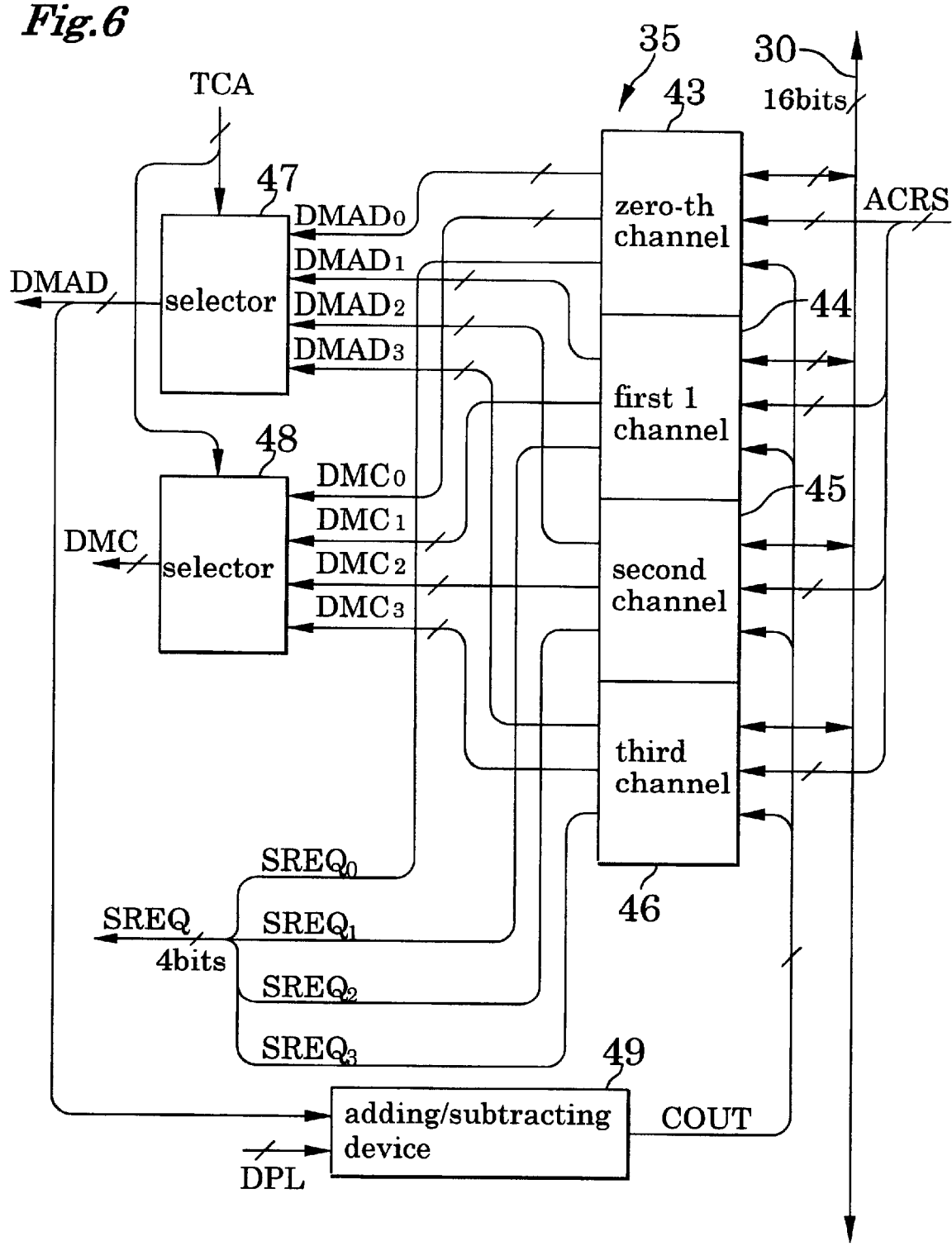
FIG. 6 is a schematic block diagram for indicating an internal arrangement of the DMA control register.

As indicated in FIG. 6, the above-described DMA control register 35 is mainly arranged by 4 sets of channels, i.e, a zero-th channel 43 to a 3rd channel 46; two pieces of selectors 47 and 48; and an adding/subtracting device 49. Various sorts of data such as the source address SAD may be read/written via the internal bus 30 from/into the zero-th channel 43 through the 3rd channel 46 under control of the CPU 22. DMA address signals $DMAD_0$ to $DMAD_3$ outputted from the zero-th channel 43 to the 3rd channel 46 are entered into the selector 47. Among these DMA address signals, such an address signal selected by the channel validity signal TCA is outputted as a DMA address signal DMAD from this selector 47, and then this DMA address signal DMAD is supplied to the channel control unit 32 and the adding/subtracting device 49. The adding/subtracting device 49 adds/subtracts the DMA address signal DMAD supplied from the selector 47 and the displacement signal DPL supplied from the channel control unit 32 to thereby output a calculation result COUT. The calculation result COUT is written into the corresponding register of the corresponding channel at a falling edge of an address counter read strobe ACR. Also, DMA control signals $DMC_0$ to $DMC_3$ outputted from the zero-th channel 43 to the 3rd channel 46 are entered into the selector 48. Among these DMA control signals, such a control signal selected by the channel validity signal TCA is outputted as a DMA control signal DMC from this selector 48, and then this DMA control signal DMC is supplied to the channel control unit 32. Furthermore, software transfer request signals $SREQ_0$ to $SREQ_3$ outputted from the zero-th channel 43 to the 3rd channel 46 directly constitute a 4-bit software transfer request signal SREQ and then this 4-bit software transfer request signal SREQ is supplied to the channel control unit 32.

INTERNAL STRUCTURE OF ZERO-TH CHANNEL

Figure 7:
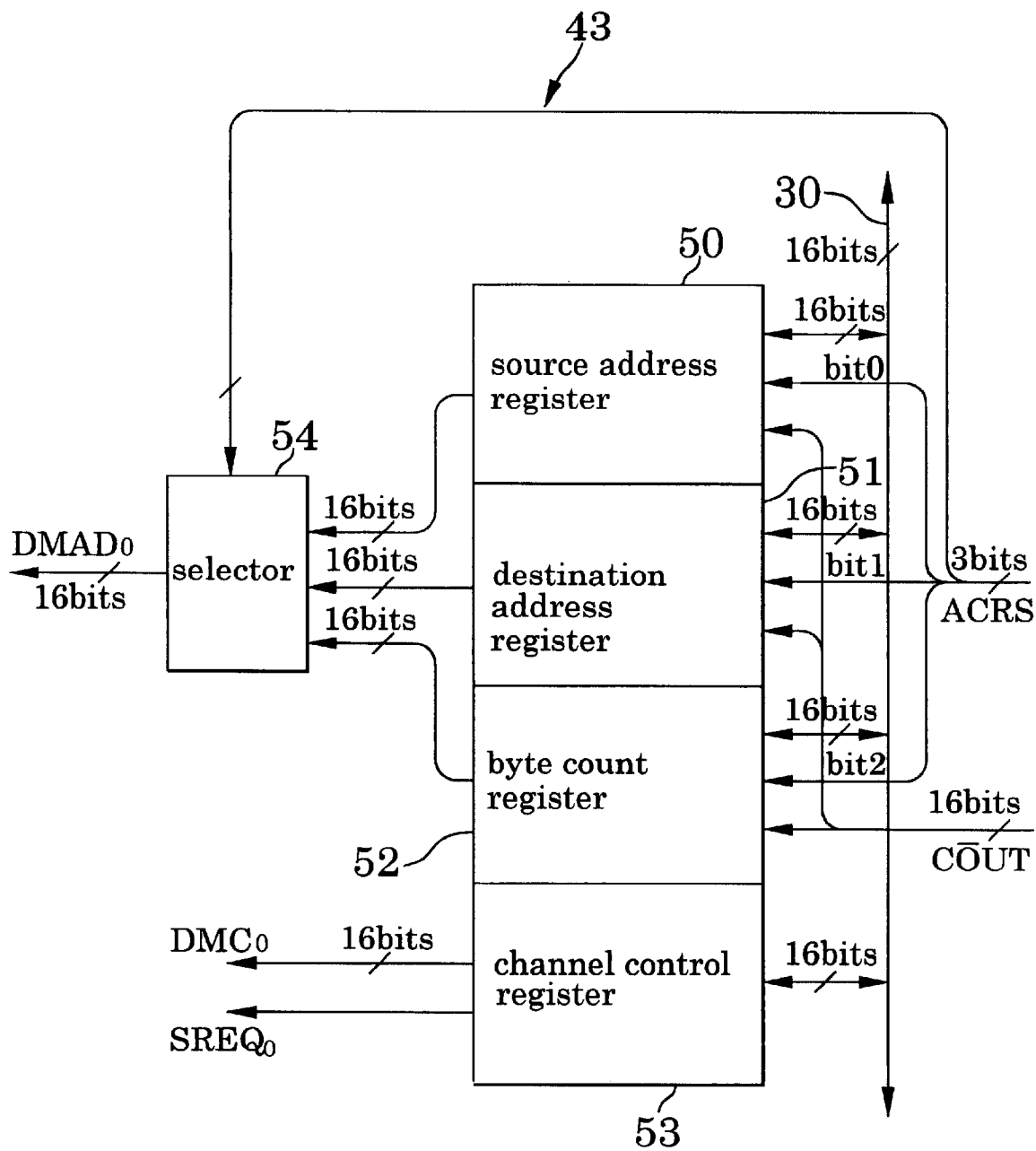
FIG. 7 is a schematic block diagram for representing a circuit arrangement of a first channel in the first information processing apparatus.

As illustrated in FIG. 7, the zero-th channel 43 is mainly arranged by a source address register 50, a destination address register 51, a byte count register 52, a channel control register 53, and a selector 54.

The source address SAD, the destination address DAD, and the byte count value BC may be read/written via the internal bus 30 from/into any of the source address register 50, the destination address register 51, and the byte count register 52 under control of the CPU 22. In the case that the zero-th channel 43 is validated by the channel validity signal TCA, the selector 54 selects such a signal (namely, source address SAD in this case) supplied from a register (assumed as source address register 50 in this case) among to the registers 50 to 52, and then outputs this selected signal as the DMA address signal $DMAD_0$. This register corresponds to 3 bits under active state of the address counter read strobe ACRS. As a result, this DMA address signal $DMAD_0$ is again selected by the selector 47 to be outputted as the DMA address signal DMAD. Thereafter, this DMA address signal DMAD is added/subtracted to/from the displacement signal DPL supplied from the channel control unit 32 in the adding/subtracting device 49. As a consequence, the calculation result COUT is written into the source address register 50 of the zero-th channel 43 at a falling edge of the address counter read strobe ACRS. Thus, the source address SAD and other values are updated in this manner.

Similarly, the registered contents of the channel control register 53 may be read/written via the internal bus 30 under control of the CPU 22, namely, the displacement value "α", the value "β" to be subtracted from the byte count value BC, the DMA transfer types and modes, and the software transfer demand. All of these registered contents other than the software transfer demand are outputted as the DMA control signal $DMC_0$ from the channel control register 53 to be supplied to the selector 48. In this case, the DMA transfer type among the DMA transfer types and modes implies the above-described 2 cycle transfer and flyby transfer. Also, as the DMA transfer mode, there are a single transfer mode, a single step transfer mode, and a block transfer mode. In the single transfer mode, every time the DMA transfer operation is accomplished one time, the DMAC 23 releases the fetched bus, and the DMA cycle sequencer 38 outputs a channel clear signal CHC. In the single step transfer mode, every time the DMA transfer operation is accomplished one time, the DMAC 23 releases the fetched bus in a similar manner to the above-described single transfer mode. Furthermore, the DMA transfer operation of this channel is carried out until the byte count value of the valid channel becomes 0. When the byte count value becomes 0, the DMA cycle sequencer 38 outputs the channel clear signal CHC.

In the block transfer mode, once the DMAC 23 accepts the DMA transfer request, the DMAC 23 executes the DMA transfer operation of this channel until the byte count value of the valid channel becomes 0, during which even when a DMA transfer demand for a channel having a higher priority than that of the present channel is issued, the present channel is not changed, but also the byte cycle of the CPU is not interrupted. When the byte count value becomes 0, the DMA cycle sequencer 38 outputs the channel clear signal CHC.

The software transfer demand constitutes as a software transfer request signal $SREQ_0$, a 4-bit software transfer request signal SREQ in combination with the software transfer request signals $SREQ_1$ to $SREQ_3$ supplied from other channels, namely first channel 44 to third channel 46. Then, this software transfer request signal $SREQ_0$ is supplied to the channel control unit 32.

It should be noted that any of the three selectors 47, 48 and 54 shown in FIG. 6 and FIG. 7 outputs such a signal having bits, all of which are "0", in order to prevent error operation in the case that all bits of the select signal, namely channel validity signal TCA and address counter read strobe ACRS are under non-active states.

It should also be noted that since structures of the remaining first to third channels 44 to 46 are substantially same as the above-described structure of the zero-th channel 43, descriptions thereof are omitted.

OPERATIONS OF FIRST INFORMATION PROCESSING APPARATUS

Figure 8:
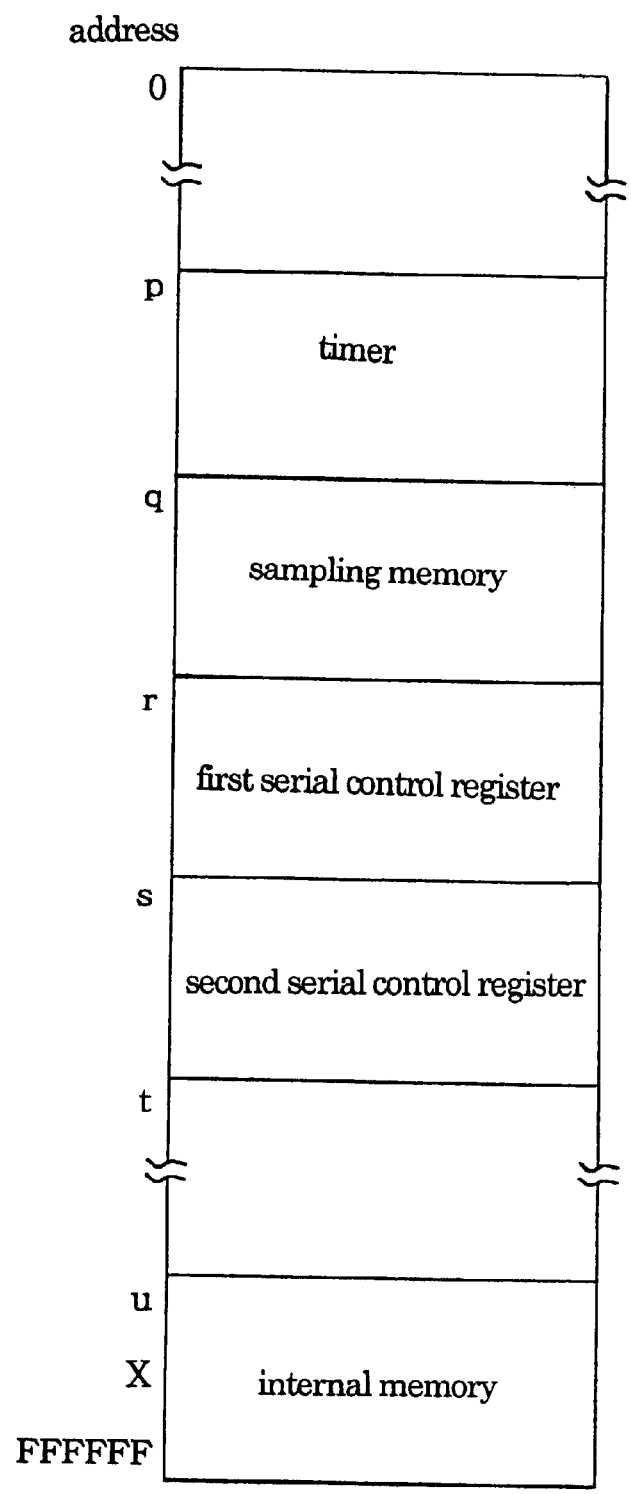
FIG. 8 schematically illustrates a structure of a memory map of the first information processing apparatus.

Next, various operations of the first information processing apparatus with the above-described arrangement will be described. First, it is now assumed that a structure of a memory map of this first information processing apparatus is indicated in FIG. 8. In FIG. 8, addresses "p" to "q−1" are allocated to the timer; addresses "q" to "(r−1)" are allocated to a sampling memory for constituting the A/D converter 26; and addresses "r" to "(s−1)" are allocated to a first serial control register for constituting the first serial interface 27. Also, addresses "s" to "(t−1)" are allocated to a second serial control register for constituting the second serial interface 28; and addresses "u" to "FFFFFF" are allocated to the internal memory 24.

Then, in this embodiment, the following assumption is made. That is, an analog signal is sampled by the A/D converter 26 at a preselected frequency so as to be converted into a digital signal. The resulting Y-byte data are transferred to the storage areas of the internal memory 24 designated by the addresses subsequent to the address "X" both in the 2 cycle DMA transfer mode and the single step DMA transfer mode. In this case, it is also assumed that the DMA data transfer operation requested by the A/D converter 26 owns the second higher priority, and the first channel 44 for constituting the DMA control register 35 is allocated. Furthermore, in this case, it is also assumed that at such a stage that the CPU 22 starts to control the A/D converter 26, both the internal bus 29 and the internal bus 30 are fetched by the CPU 22, and any of these bus request signals BREQ is not brought into the active state.

First, when the CPU 22 fetches a command code during execution of a program and this command code is used to A/D-convert the analog signal by the A/D converter 26, the address "q" of the sampling memory for constituting the A/D converter 26 functioning as a source is transferred as a source address via the internal bus 30 to the DMA control register 35 of the DMAC 23. Also, the address "X" of the internal memory 24 functioning as the destination is similarly transferred as a destination address DAD via the internal bus 30 to the DMA control register 35 of the DMAC 23. Also, the byte number "Y" of the data which is to be transferred as a byte count value BC is similarly transferred via the internal 30 to the DMA control register 35 of the DMAC 23. Also, both the 2 cycle transfer mode and the signal step transfer mode are transferred as the types and the modes of the DMA transfer operation are similarly transferred via the internal bus 30 to the DAM control register 35 of the DMAC 23. Furthermore, the displacement value "α" and the value "β" to be subtracted from the byte count value BC are similarly transferred via the internal bus 30 to the DMA control register 35 of the DMAC 23. In addition, a sampling operation starting command is issued via the internal bus 30 to the A/D converter 26.

As a result, in the first channel 44, the address "q", the address "X", and the byte number "Y" are written into the source address resister 50, the destination address register 51, and the byte count register 52, respectively, whereas the displacement value "α", the value "β" to be subtracted from the byte count value BC, the DMA transfer type (2 cycle transfer type, in this case), and the DMA transfer mode (single step transfer mode, in this case) are written into the channel control register 53. When the A/D converter 26 receives the sampling operation starting command via the internal bus 30 from the CPU 22, this A/D converter 26 A/D-converts the input analog signal into the digital signal corresponding thereto at a preselected sampling frequency to obtain the Y-byte digital data. This Y-byte data is once stored into the internal sampling memory, and thereafter the internal request signal $IREQ_1$ is supplied to the DMAC 23.

Accordingly, since the internal request signal $IREQ_1$ is supplied as the bus request signal BREQ via the OR gate 36 shown in FIG. 3 to the priority encoder 37, this priority encoder 37 produces such a channel validity signal TCA capable of validating the first channel 44 based upon the above-described formula (2) in this case in response to the bus request signal BREQ. Then, the priority encoder 37 supplies the produced channel validity signal TCA to both the DMA control register 35 and the DMA cycle sequencer 38.

Upon input of the channel validity signal TCA capable of validating the first channel 44, the DMA cycle sequencer 38 supplies the 30-bit address counter read strobe ACRS to the DMA control register 35. As a result, the DMA control register 35 outputs the selected signal as the DMA address signal $DMAD_1$ to the DMA cycle sequencer 38 in such a manner that in the first channel 44, the selector 54 sequentially selects the source address SAD supplied from the source address register 50, the destination address DAD supplied from the destination address register 51, and the byte count value BC supplied from the byte count register 52. Furthermore, both the selectors 47 and 48 select the DMA address signal $DMAD_1$ and the DMA control signal $DMC_1$, which are supplied from the first channel 44, and then supplies these selected signals as a DMA address signal DMAD and a DMA control signal DMC to the DMA cycle sequencer 38.

As a consequence, since the DMA cycle sequencer 38 decodes the source address SAD and the destination address DAD indicated by the DMA address signal DMAD, this DMA cycle sequencer 38 may judge that the data is transferred in the DMA transfer mode from the A/D converter 26 to the internal memory 24. Thus, the DMA cycle sequencer 38 outputs the request signal REQ corresponding thereto to the bus controller 31 of the CPU 22 in the bus cycle indicated by the DMA control signal DMC. In this case, the DMA cycle sequencer 38 outputs such a request signal REQ having a value of "11" to the bus controller 31 of the CPU 22 in the 2 cycle transfer mode. This request signal REQ having the value of "11" is used to request releasing of both the internal buses 29 and 30.

ACKNOWLEDGE SIGNAL SUPPLY FROM BUS CONTROLLER TO DMAC

Figure 9:
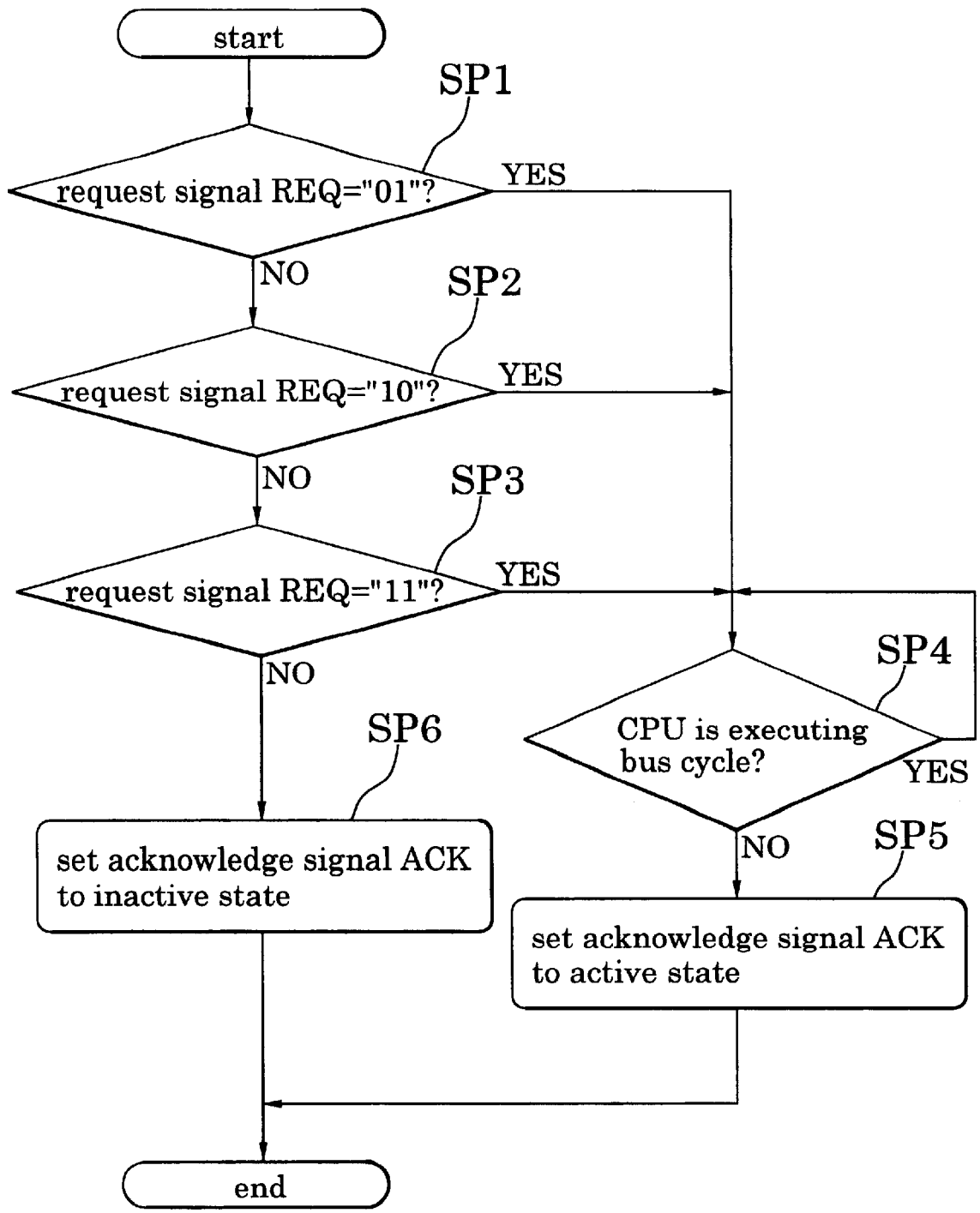
FIG. 9 is a flow chart for describing operation of the first information processing apparatus for supplying an acknowledge signal ACK to DMAC.

Referring to a flow chart shown in FIG. 9, a description is made of supply operation of the acknowledge signal ACK from the bus controller 31 to the DMAC 23.

When the 2-bit request signal REQ is supplied from the DMAC23, the bus controller 31 judges at a step SP1 as to whether or not the value of this supplied request signal REQ is equal to "01". In other words, the bus controller 31 judges as to whether or not releasing of only the internal bus 29 is requested. In this case, since the value of this supplied request signal REQ is equal to "11", the judgement result at the step SP1 becomes "NO", and then the supply process operation is advanced to a further step SP2.

To the contrary, in the case that the judgement result of the above step SP1 is equal to "YES", namely releasing of only the internal bus 29 is requested, the process operation is advanced to another step SP4.

On the other hand, the bus controller 31 judges at the step SP2 as to whether or not the value of the request signal REQ is equal to "10". In other words, the bus controller 31 judges as to whether or not releasing of only the internal bus 30 is requested. In this case, since the value of this supplied request signal REQ is equal to "11", the judgement result at the step SP2 becomes "NO", and then the supply process operation is advanced to a further step SP3.

To the contrary, in the case that the judgement result of the above step SP2 is equal to "YES", namely releasing of only the internal bus 30 is requested, the process operation is advanced to the step SP4.

At the above-described step SP3, the bus controller 31 judges as to whether or not the value of the request signal REQ is equal to "11". In other words, the bus controller 31 judges as to whether or not releasing of both the internal bus 29 and the internal bus 30 are requested. In this case, since the value of this supplied request signal REQ is equal to "11", the judgement result at the step SP3 becomes "YES", and then the supply process operation is advanced to the above-described SP4.

To the contrary, in the case that the judgement result of the above step SP3 is equal to "NO", namely releasing of neither the internal bus 29, nor the internal bus 30 is requested, the process operation is advanced to another step SP6.

At the step SP4, the bus controller 31 checks as to whether or not the CPU 22 is executing the bus cycle. That is, the bus controller 31 checks as to whether or not the internal buses 29 and 30 are under use. In such a case that this judgement result becomes YES, the above-explained judgement is repeatedly performed. Then, when the CPU 22 accomplishes the presently executed bus cycle and the bus controller 31 confirms this accomplishment, the judgement result at the step SP4 becomes "NO", and thereafter the process operation is advanced to a step SP5.

On the other hand, the bus controller 31 supplies the acknowledge signal ACK to the DMAC 23 while maintaining this acknowledge signal ACK under inactive state.

In the above-described operation, the process operation defined at the step SP4 is related to one of the DMA transfer systems called as a "CPU cycle steal". However, the present invention is apparently not limited to this CPU cycle steal system. Alternatively, for example, the information processing apparatus of the present invention may employ other DMA transfer systems such as the memory cycle steal system where the data is transferred by utilizing the empty time of the internal memory 24, and the interlock transfer system where the operation of the CPU 22 is stopped by entering the hold input, and the data is transferred while stopping the operation of the CPU 22.

Thereafter, when the bus controller 31 supplies the acknowledge signal ACK to the DMA cycle sequencer 38, this DMA cycle sequencer 38 may recognize that both the internal bus 29 and the internal bus 30 are freely accessible, and thus controls the bus controller 31 so as to disconnect the electric connections established between the CPU 22 and the respective internal buses 29 and 30. Furthermore, the DMA cycle sequencer 38 controls bus controllers (not shown in detail) of the respective internal memory 24 and A/D converter 26 so as to electrically connect between the internal memory 24, the A/D converter 26 and the internal buses 29, 30, respectively. Also, the DMA cycle sequencer 38 produces a data control signal DTC, and an address control signal ADC to be supplied to the data control unit 33 and the address control unit 34, respectively. This data control signal DTC is used to instruct inputting of the data from the internal bus 29, and outputting of the data to t he internal bus 30. Also, this address control signal ADC is used to instruct outputting of the destination address DAD to the internal bus 29 and further outputting of the source address SAD to the internal bus 30.

OPERATION OF FIRST CHANNEL DURING DMA TRANSFER OPERATION

Figure 10:
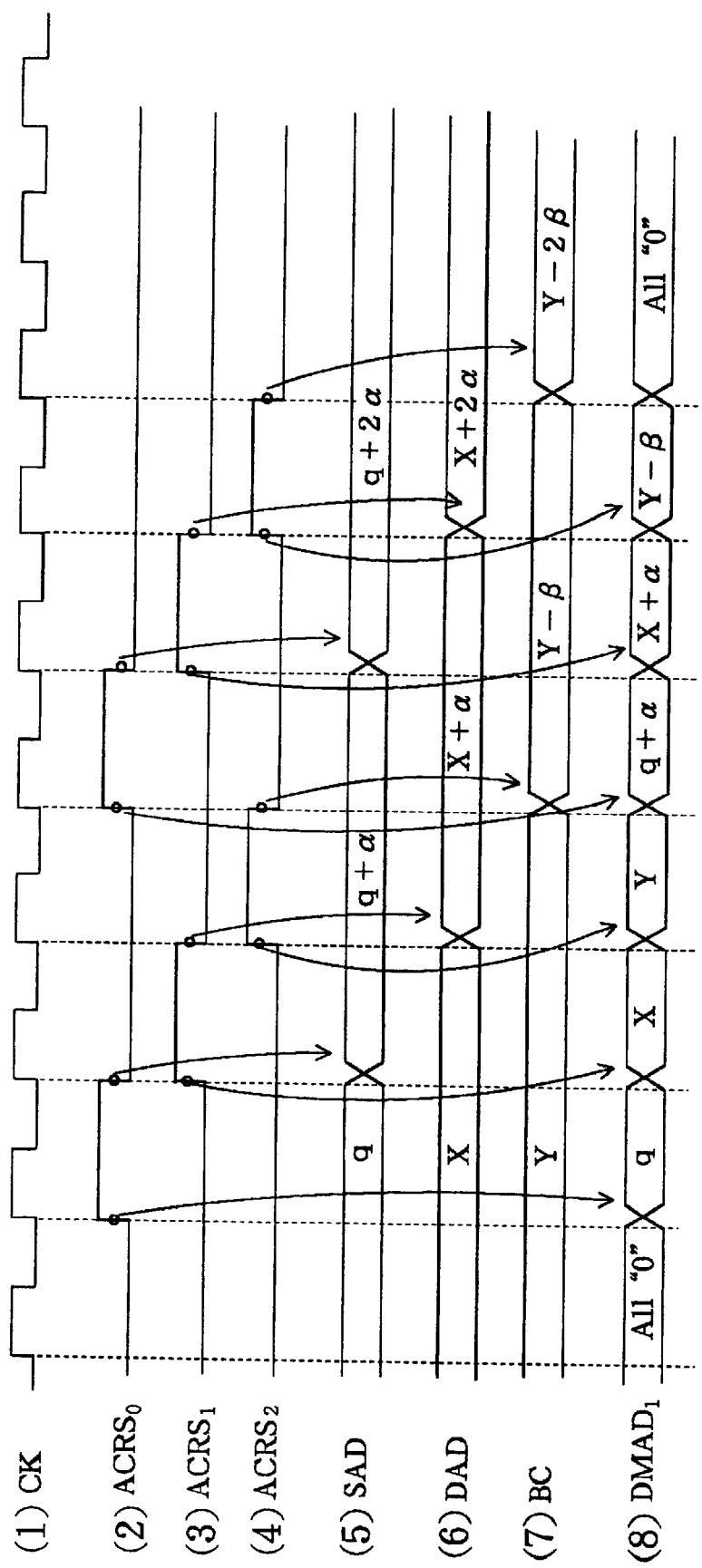
FIG. 10 shows a timing chart for explaining operation performed in the first channel during DMA transfer operation.

Referring to timing charts indicated in FIG. 6, FIG. 7, and FIG. 10, operations of the first channel 44 during the DMA transfer operation will be explained. The below-mentioned assumption is made in this embodiment. That is, as represented in FIG. 10(5) to FIG. 10(7), the address "q" is set as the source address SAD to the source address register 50 of the first channel 44. The address "X" is set as the destination address DAD to the destination address register 51. The byte number "Y" is set as the byte count value BC to the byte count register 52. These address "q", address "X", and byte number "Y" are supplied from the CPU 22 via the internal bus 30.

Also, as represented in FIG. 10(2) to FIG. 10(4), since all of the bits $ACRS_0$ to $ACRS_2$ of the address count read strobe ACRS supplied from the DMA cycle sequencer 38 are set to non-active states, as indicated in FIG. 10(8), such a DMA address signal $DMAD_1$, all of which bits are equal to "0", is outputted from the selector 54. In addition, since the DMA transfer operation is now carried out in response to the request issued by the A/D converter 26, the channel validity signal TCA capable of validating the first channel 44 is entered into the selector 47 shown in FIG. 6, and also the selector 47 selects the DMA address signal $DMAD_1$ to be outputted.

When the address counter read strobe ACRS synchronized with the clock CK (see FIG. 10(1)) is supplied from the DMA cycle sequencer 38 under such a condition, the selector 54 sequentially selects the address "q", the address "X" and the byte number "Y" in response to rising edges of the respective bits $ACRS_0$ to $ACRS_2$ of the address counter read strobe ACRS indicated in FIG. 10(2) to FIG. 10(4). Then, this selector 54 sequentially outputs the selected addresses and byte number as the DMA address signal $DMAD_1$ (see FIG. 10(2)).

As a result, the DMA address signal $DMAD_1$ is outputted via the selectors 54 and 47 as the DMA address signal DMAD, and thereafter is sequentially added/subtracted in the adding/subtracting device 49 to/from the displacement signal DPL, namely the displacement value "α" supplied from the channel control unit 32, and the value "β" to be subtracted from the byte count value BC. As a result of this calculation, the calculation results, namely "q+α", "X+α" and "Y−β" are sequentially written into the source address register 50, the destination address register 51, and the byte count register 52, as represented in FIG. 10(5) to FIG. 10(7), at the rising edges of the respective bits $ACRS_0$ to $ACRS_2$ of the address counter read strobe ACRS shown in FIG. 10(2) to FIG. 10(4).

Then, in response to next rising edges of the respective bits $ACRS_0$ to $ACRS_2$ of the address counter read strobe ACRS indicated in FIG. 10(2) to FIG. 10(4), the selector 54 sequentially selects new addresses "q+α", "X+α" and a new byte count value "Y−β" to output these selected values as the DMA address signal $DMAD_1$ (see FIG. 10(8)).

As previously explained, the source address SAD, the destination address DAD, and the byte count value BC are sequentially updated, and then updated addresses and value are supplied as the DMA address signal DMAD to the DMA cycle sequencer 38.

As a result, when the DMA address signal DMAD shown in FIG. 10(8) is supplied to the DMA cycle sequencer 38, this DMA cycle sequencer 38 produces the data control signal DTC and the address control signal ADC in response to the source address SAD, the destination address DAD, and the byte count value BC, which are sequentially updated. The DMA cycle sequencer 38 supplies these data control signal DTC and address control signal ADC to the data control unit 33 and the address control unit 34.

As a consequence, the address control unit 34 outputs the address via the internal buses 29 and 30 to the internal memory 24 and the A/D converter 26 in response to the address control signal ADC sequentially supplied from the channel control unit 32. Thus, the data control unit 33 initiates the bus cycles with respect to both the internal buses 29 and 30 in response to the data control signal DTC sequentially supplied from the channel control unit 32, so that the data entered from the relevant address of the A/D converter 26 via the internal bus 30 is latched by the data latch 41. Subsequently, this latched data is transferred via the internal bus 29 to the relevant address of the internal memory 24.

As previously explained, the Y-byte data stored in the sampling memory of the A/D converter 26 is DMA-transferred via the internal bus 30, the DMAC 23, and the internal bus 29 into the storage areas of the internal memory 24, defined at the addresses after the address "X", in both the 2 cycle transfer type and the single step transfer mode.

DMA TRANSFER OPERATION IN SINGLE STEP TRANSFER MODE

Figure 11:
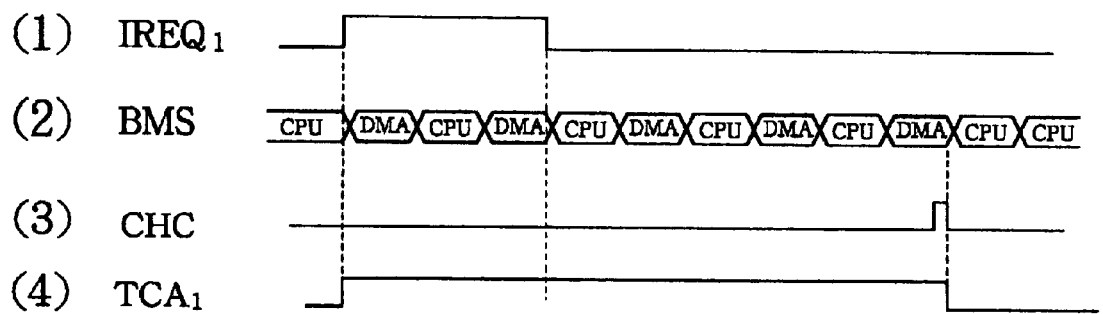
FIG. 11 is a timing chart for representing an example of a relationship between other signals and fetch states of internal buses during DMA transfer operation in a single step transfer mode in the first information processing apparatus.

FIG. 11 is a timing chart for representing one example of a relationship between other signals and fetch conditions BMS of the internal buses 29 and 30 during the DMA transfer operation in the above-described single step transfer mode. In FIG. 11(2), symbols "CPU" and "DMA" indicate that in the relevant bus cycle, either the CPU 22 or the DMAC 23 fetches any one of the internal buses 29 and 30, which are required to be released, otherwise both the internal buses 29 and 30. This implication is similarly applied to other relationships shown in FIG. 12 and FIG. 14 to FIG. 16. As apparent from FIG. 11, when the request signal (namely, internal request signal $IREQ_1$ in this case) is once supplied in the single step transfer mode (see FIG. 11(1)), the DMAC 23 releases the internal buses 29 and 30 which have been so far fetched every time the DMA transfer operation is accomplished one time. The bit $TCA_1$ of the channel validity signal TCA is under active state (see FIG. 11(4)) until the byte count value BC of the validated first channel 44 becomes 0. When the DMA transfer operation of the first channel 44 is continued and thus the byte count value BC becomes 0, the DMA cycle sequencer 38 outputs the channel clear signal CHC (see FIG. 11(3)). As a result, the channel validity signal TCA is invalidated and the bit $TCA_1$ is brought into the non-active state (see FIG. 11(4)). It should be noted that when the CPU 22 does not use the internal buses 29 and 30 during the active state of the request signal, the DMA transfer operation is continuously carried out. This operation is similarly applied to those of FIG. 12, and FIG. 14 to FIG. 16.

DMA TRANSFER OPERATION IN SINGLE TRANSFER MODE

Figure 12:
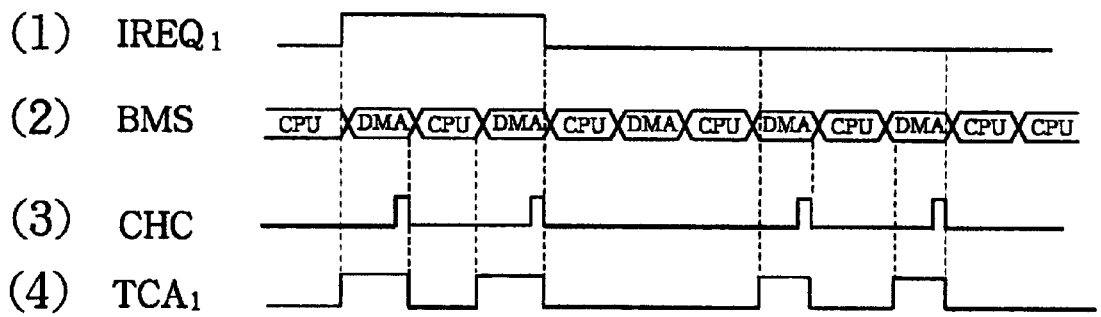
FIG. 12 is a timing chart for representing an example of a relationship between other signals and fetch states of internal buses during DMA transfer operation in a single transfer mode in the first information processing apparatus.

FIG. 12 is a timing chart for indicating one example of a relationship between other signals and fetch conditions BMS of the internal buses 29 and 30 during the DMA transfer operation in the single transfer mode. In this single transfer mode, once the request signal (namely, internal request signal $IREQ_1$ in this case) is supplied (see FIG. 12(1)), the DMAC 23 releases the internal buses 29 and 30 which have been so far fetched every time the DMA transfer operation is accomplished one time, and also the DMA cycle sequencer 38 outputs the channel clear signal CHC. After the request signal has been brought into the non-active state, when the same request signal is again brought into the active state (see FIG. 12(1)), the DMAC 23 fetches the internal buses 29 and 30 to execute the DMA transfer operation.

In the above-explained operations, the internal request signal is inputted from a single I/O device into the DMAC 23. Next, various operations will be described in such a case that a plurality of internal request signals IREQs, the external request signal EREQ, or the software transfer request signal SREQ are inputted to the DMAC 23.

The above-described internal request signal IREQ, external request signal EREQ, and software transfer request signal SREQ are OR-gated by the OR gate 36 of the channel control unit 32 for constituting the DMAC 23 to produce a 4-bit bus request signal BREQ which will then be supplied to the priority encoder 37 (see FIG. 3). It should be noted that the respective bits $BREQ_0$ to $BREQ_3$ of the bus request signal BREQ correspond to the zero-th channel 43 through the 3rd channel 46. The zero-th channel 43 owns the highest priority, the first channel 44 owns the second highest priority, and the second channel 45 owns the third highest priority, and further, the third channel 46 owns the lowest priority. As a consequence, as represented in FIG. 13(1) to FIG. 13(4), when the respective bits $BREQ_0$ to $BREQ_3$ of the bus request signal BREQ are changed, the priority encoder 37 changes the respective bits $TCA_0$ to $TCA_3$ of the channel validity signal TCA in accordance with the above-described priority orders as represented in FIG. 13(5) to FIG. 13(8), and then outputs the channel validity signal TAC having the changed bits.

In other words, since the zero-th channel 43 owns the highest, or top priority, the change in the bit $BREQ_0$ of the bus request signal BREQ is equal to the change in the bit $TCA_0$ of the bit $TCA_0$ of the bus request signal BREQ. That is to say, the I/O device and other apparatuses, which output the request signal corresponding to the bit $BREQ_0$ of the bus request signal BREQ can perform the DMA transfer operations with completely satisfying the request.

Also, since the first channel owns the second highest priority, the change in the bit $BREQ_1$ of the bus request signal BREQ is equal to the change in the bit $TCA_1$ of the channel valid signal TCA as to only such a portion that the bit $BREQ_0$ is not under active state. In other words, the I/O device and other apparatuses which output the request signal corresponding to the bit $BREQ_1$ of the bus request signal BREQ can perform the DMA transfer operations with substantially satisfying the request. Subsequently, the I/O device and other apparatuses, which output the request signals having the lower priority orders, cannot perform the DMA transfer operations with satisfying the requests in accordance with lowering of the priority orders thereof.

Figure 13:
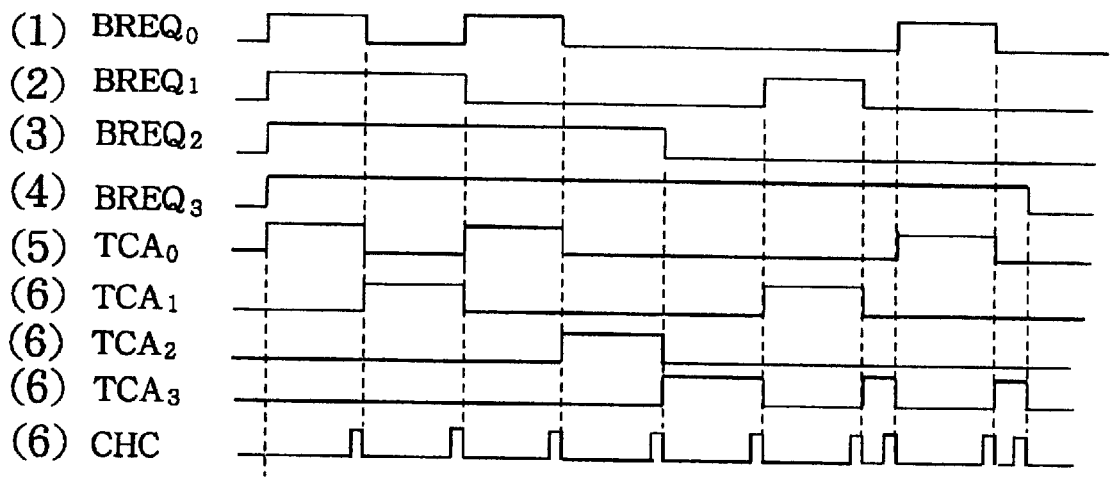
FIG. 13 is a timing chart for showing an example of a relationship between the respective bits $BREQ_0$ to $BREQ_3$ of the bus request signal BREQ, the respective bits $TCA_0$ to $TCA_3$ of the channel validity signal TCA, and the channel clear signal CHC in the first information processing apparatus.

It should also be noted that the channel clear signal CHC shown in FIG. 13(9) is outputted immediately before the DMA transfer operation in the relevant channel is completed by that the DMA cycle sequencer 38 judges the value of the byte count value BC of the byte count register 52 in the relevant channel in the single step transfer mode and the block transfer mode. For example, in such a case that the value of the byte count value BC is equal to "+1", when the DMA transfer operation is ended one time in a certain bus cycle, the DMA cycle sequencer 38 can judge that the DMA transfer operation is accomplished during the DMA transfer for operation in the next bus cycle.

DMA TRANSFER OPERATION IN SINGLE TRANSFERMODE UNDER ACTIVE STATES OF BUS REQUEST SIGNAL

Figure 14:
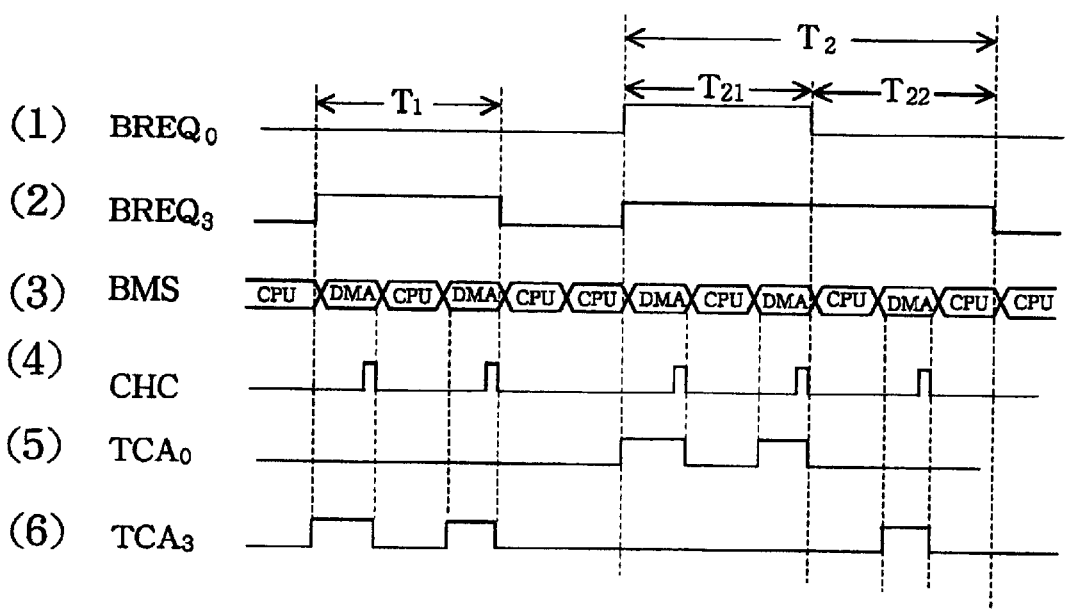
FIG. 14 is a timing chart for representing an example of a relationship between other signals and fetch states of the internal bus during DMA transfer operation in the single transfer mode in the case that the bits $BREQ_0$ to $BREQ_3$ of the bus request signal BREQ are set to active states in the first information processing apparatus.

FIG. 14 is a timing chart for representing one example of a relationship between other signals and fetch conditions BMS of the internal buses 29 and 30 during the DMA transfer operation in the single transfer mode in the case that both the bit $BREQ_0$ and the bit $BREQ_3$ of the bus request signal BREQ are set to active states. As seen from the timing chart, since only the bit $BREQ_3$ of the bus request signal BREQ is under active state in a time period "$T_1$", the bit $TCA_3$ of the channel validity signal TCA corresponding to this bit $BREQ_3$ is brought into the active state every time the DMA transfer operation is carried out 1 time, and such an apparatus to which the request signal corresponding to the bit $BREQ_3$ can perform the DMA transfer operation. However, in a time period $T_{21}$ within a time period $T_2$ during which the bit $BREQ_3$ is under active state, since the bit $BREQ_0$ having the higher priority is also under active state, the bit $TCA_0$ of the channel validity signal TCA corresponding to the bit $BREQ_0$ becomes the active state every time the DMA transfer operation is performed one time. Then, such an apparatus to which the request signal corresponding to the bit $BREQ_0$ is supplied performs the DMA transfer operation, while having a top priority. Then, since only the bit $BREQ_3$ is under active state in the remaining period $T_{22}$, the bit $TCA_3$ of the channel validity signal TCA corresponding to the bit $BREQ_3$ is brought into the active state every time the DMA transfer operation is performed one time, and thus, such an apparatus to which the request signal corresponding to the bit $BREQ_3$ is supplied can perform the DMA transfer operation.

DMA TRANSFER OPERATION IN SINGLE STEP TRANSFER MODE UNDER ACTIVE STATES OF BUS REQUEST SIGNAL

Figure 15:
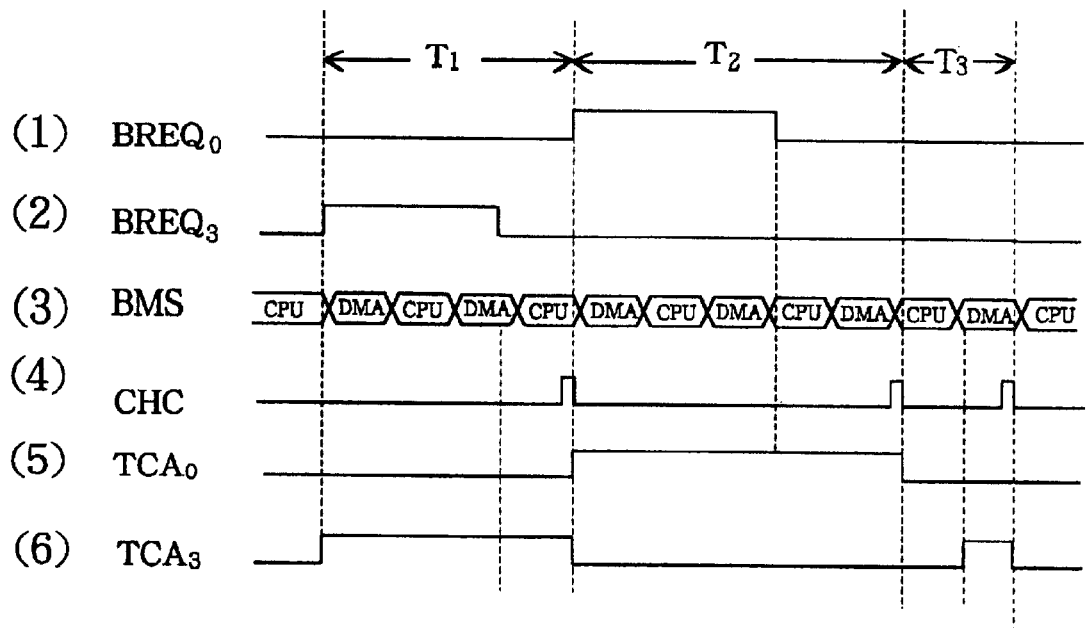
FIG. 15 is a timing chart for representing an example of a relationship between other signals and fetch states of the internal bus during DMA transfer operation in the single step transfer mode in the case that the bits $BREQ_0$ to $BREQ_3$ of the bus request signal BREQ are set to active states in the first information processing apparatus.

FIG. 15 is a timing chart for representing one example of a relationship between other signals and fetch conditions BMS of the internal buses 29 and 30 during the DMA transfer operation in the single step transfer mode in the case that both the bit $BREQ_0$ and the bit $BREQ_3$ of the bus request signal BREQ are set to active states. As seen from the timing chart, in a time period $T_1$, the bit $BREQ_3$ has once been set to the active state, and the active state of the bit $TCA_3$ of the channel validity signal TCA corresponding to the bit $BREQ_3$ is maintained. As a result, the DMAC 23 releases the internal buses 29 and 30 every time the DMA transfer operation is accomplished one time. However, such an apparatus to which the request signal corresponding to the bit $BREQ_3$ is supplied can continuously perform the DMA transfer operation.

However, in a time period $T_2$, since the bit $BREQ_0$ having the high priority is once brought into the active state, the bit $TCA_0$ of the channel validity signal TCA corresponding to the bit $BREQ_0$ maintains the active state thereof until the byte count value BC of the zero-th channel 43 becomes 0, and further the DMAC 23 releases the internal buses 29 and 30 every time the DMA transfer operation is accomplished 1 time. Such an apparatus to which the request signal corresponding to the bit $BREQ_0$ is supplied continues the DMA transfer operation. Then, when the relevant byte count value BC becomes 0, since the DMA cycle sequencer 38 outputs the channel clear signal CHC (see FIG. 15(4)), the channel validity signal TCA is invalidated and the bit $TCA_0$ is brought into the non-active state (see FIG. 15(5)).

As a result, since the byte count value BC of the third channel 46 has not yet become 0 in a time period $T_3$, the DMA cycle sequencer 38 again supplies the request signal REQ to the bus controller 31, so that this DMA cycle sequencer 38 receives the acknowledge signal ACK from the bus controller 31 to again fetch the internal buses 29 and 30. Thereafter, the DMA cycle sequencer 38 causes the bit TSA3 of the channel validity signal TCA corresponding to the bit $BREQ_3$ to be set to the active state until the byte count value BC of the third channel 46 becomes 0.

As a consequence, such an apparatus to which the request signal corresponding to the bit $BREQ_3$ is supplied can perform the DMA transfer operation within a time period during which the bit $TCA_3$ is under active state.

DMA TRANSFER OPERATION IN BLOCK TRANSFER MODE UNDER ACTIVE STATES OF BUS REQUEST SIGNAL

Figure 16:
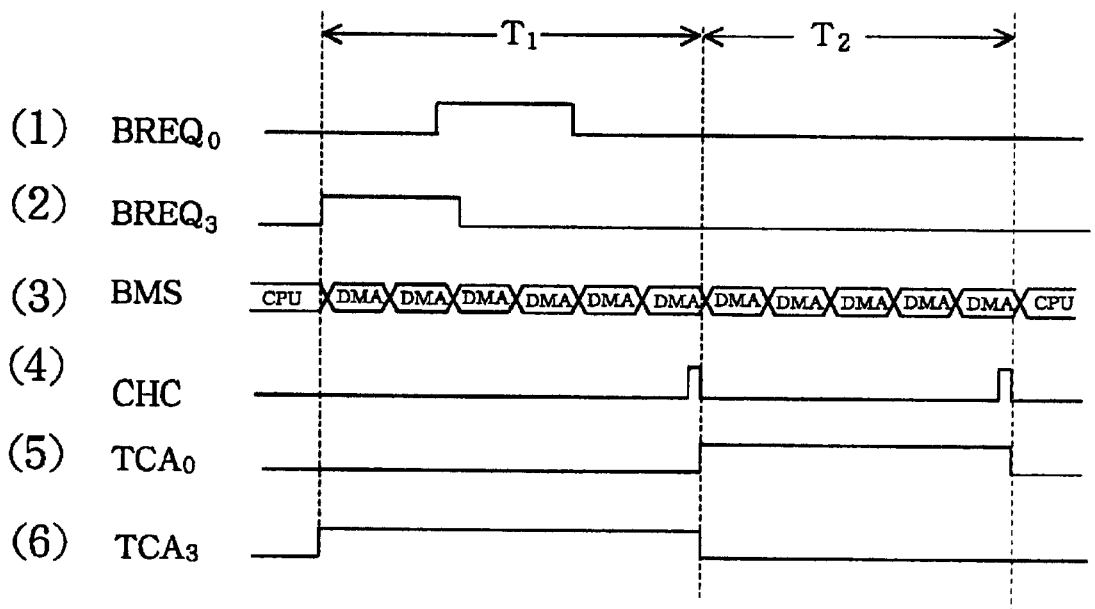
FIG. 16 is a timing chart for representing an example of a relationship between other signals and fetch states of the internal bus during DMA transfer operation in the block transfer mode in the case that the bits $BREQ_0$ to $BREQ_3$ of the bus request signal BREQ are set to active states in the first information processing apparatus.

FIG. 16 is a timing chart for representing one example of a relationship between other signals and fetch conditions BMS of the internal buses 29 and 30 during the DMA transfer operation in the block transfer mode in the case that both the bit $BREQ_0$ and the bit $BREQ_3$ of the bus request signal BREQ are set to active states. As seen from this timing chart, in a time period $T_1$, since the bit $BREQ_3$ has been previously set to the active state, even when the bit $BREQ_0$ having the higher priority than that of the above-described bit $BREQ_3$ is brought into the active state, the channel validity signal TCA corresponding to the bit $BREQ_3$ maintains the active state thereof until the byte count value BC of the third channel 46 becomes 0. As a consequence, the DMAC 23 does not release the internal buses 29 and 30, and such an apparatus to which the request signal corresponding to the bit $BREQ_3$ is supplied can continuously perform the DMA transfer operation. Then, when this byte count value BC becomes 0, since the DMA cycle sequencer 38 outputs the channel clear signal CHC (see FIG. 16(4)), the channel validity signal is invalidated and the bit $TCA_3$ is brought into the non-active state (see FIG. 16(6)).

Next, in a time period $T_2$, since the bit $BREQ_0$ has been once brought into the active state, the DMAC 23 immediately sets the bit $TCA_0$ of the channel validity signal TCA corresponding to the bit $BREQ_0$ to the active state without releasing the internal buses 29 and 30. Then, since the DMAC 23 maintains this active state until the byte count value BC of the zero-th channel 43 becomes 0, such an apparatus to which the request signal corresponding to the bit $BREQ_0$ is supplied can continuously perform the DMA transfer operation.

OVERALL ARRANGEMENT OF SECOND INFORMATION PROCESSING APPARATUS

Figure 17:
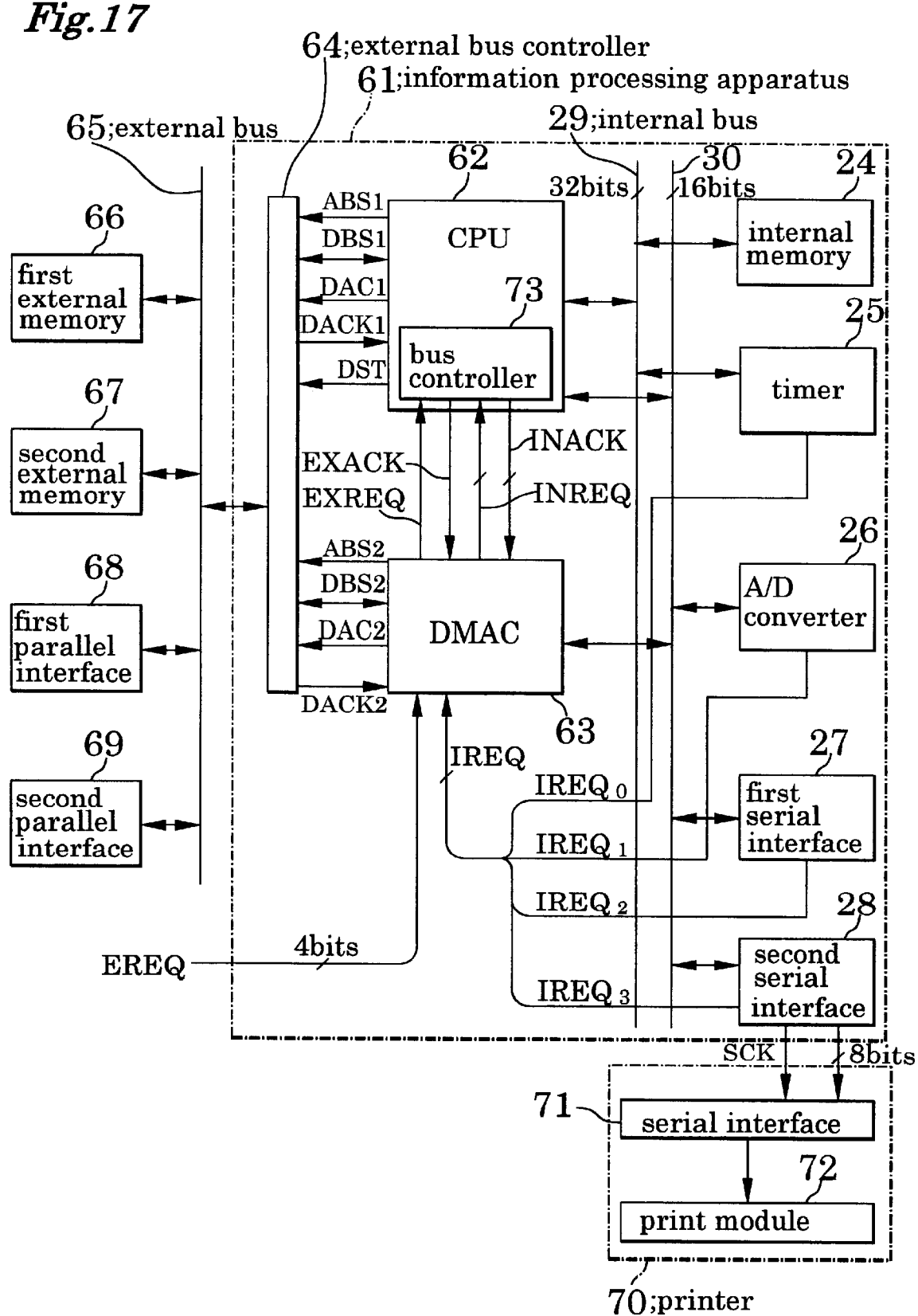
FIG. 17 is a schematic block diagram for representing an internal arrangement of an information processing apparatus according to a second embodiment of the present invention.

FIG. 17 is a schematic block diagram for indicating an overall arrangement of an information processing apparatus 61 according to a second embodiment of the present invention. It should be noted that the same reference numerals shown in FIG. 1 will be employed as those for representing the same, or similar structural elements indicated in FIG. 17.

As indicated in this drawing, this second information processing apparatus 61 is arranged by a CPU (central processing unit) 62, a DMAC (direct memory access controller) 63, an internal memory 24, a timer 25, an A/D (analog-to-digital) converter 26, first and second serial interfaces 27/28, two internal buses 29/30, and an external bus controller 64. These structural elements are manufactured on an one semiconductor chip, namely a single-chip microcomputer. The CPU 62, the DMAC 63, and the internal memory 24 are connected to each other via the internal bus 29, whereas the CPU 62, the DMAC 63, the timer 25, the A/D converter 26, and the first/second serial interfaces 27/28 are connected to each other via the internal bus 30.

The CPU 62 is connected via a first address bus ABS 1 and a first data bus DBS 1 to the external bus controller 64. A first data access control signal DACK 1 is supplied from the CPU 62 to the external bus controller 64, whereas a first data acknowledge signal DACK 1 is supplied from the external bus controller 64 to the CPU 62. Based upon the first data access control signal DAC 1, the external bus controller 64 produces various sorts of bus cycles on an external bus (system bus) 65. The first data acknowledge signal DACK 1 indicates that a data transfer operation is allowed.

The DMAC 63 is connected via a second address bus ABS 2 and a second data bus DBS 2 to the external bus controller 64. A second data access control signal DAC 2 is supplied from the DMAC 63 to the external bus controller 64, whereas a second data acknowledge signal DACK 2 is supplied from the external bus controller 64 to the DMAC 63. Based upon the second data access control signal DAC 2, the external bus controller 64 produces various sorts of bus cycles on the external bus (system bus) 65. The second data acknowledge signal DACK 2 indicates that a data transfer operation is allowed.

Also, the external bus 25 is connected via the external bus controller 64 to this second information processing apparatus 61. The first and second external memories 66 and 67, and further the first and second parallel interfaces 68 and 69 are connected to this external bus 65. Furthermore, a printer 70 is connected via the second serial interface 28 to the second information processing apparatus 61. The printer 70 contains a serial interface 71 and a printing module 72. 8-bit serial data is supplied via the second serial interface 28 and the serial interface 71 to this printer 70 in combination with a serial clock "SCK". This 8-bit serial data is temporarily stored into a serial control register (not shown in detail) provided within the serial interface 71, and thereafter is supplied to the print module 72 so as to be printed out.

The CPU 62 controls circuit connections/disconnections with these internal buses 29/30, and contains a bus controller 73. The signals for fetching/releasing the internal buses 29/30 and the external bus 65 are supplied/derived to/from the bus controller 73. This bus controller 73 judges as to whether or not any one of the internal buses 29/30 and the external bus 65 are allowed to be released based upon a 2-bit internal request signal "INREQ" sent from the DMAC 63, an external request signal "EXREQ", and an operation condition of the CPU 62. This 2-bit internal request signal "INREQ" indicates a request for releasing either one or both the internal buses 29/30. The 1-bit external request signal "EXREQ" indicates a request for releasing the external bus 65. Then, this bus controller 73 supplies a 2-bit internal acknowledge signal "INACK" and a 1-bit external acknowledge signal "EXACK", which indicate this judgment result, to the DMAC 63.

It is now assumed in this second embodiment that a condition "A" implies such a condition that the CPU 62 releases neither the internal buses 29/30, nor the external bus 65. A condition "B" implies such a condition that the CPU 62 releases either the internal bus 29 or the internal bus 30. A condition "C" implies such a condition that the CPU 62 releases both the internal bus 29 and the internal bus 30. A condition "D" implies such a condition that the CPU 62 releases only the external bus 65. A condition E implies such a condition that the CPU 62 releases the external bus 65 and either the internal bus 29 or the internal bus 30. It should be understood that there is no such a condition that the CPU 62 releases any one of the internal buses 29/30, and the external bus 65, because of the operating rate of the CPU 62. Also, a condition transition between the condition B and the condition D is not set, since such a condition transition cannot be conceived under normal state. Moreover, since the transition between the condition B and the condition E causes an occurrence of a so-called "dead lock" phenomenon, this transition is prohibited.

Then, the bus controller 73 judges how to transfer the condition among the above-described 5 conditions based upon the respective bit values "$INREQ_0$" and "$INREQ_1$" of the internal request signal "INREQ", and also the value of the external request signal "EXREQ".

Figure 18:
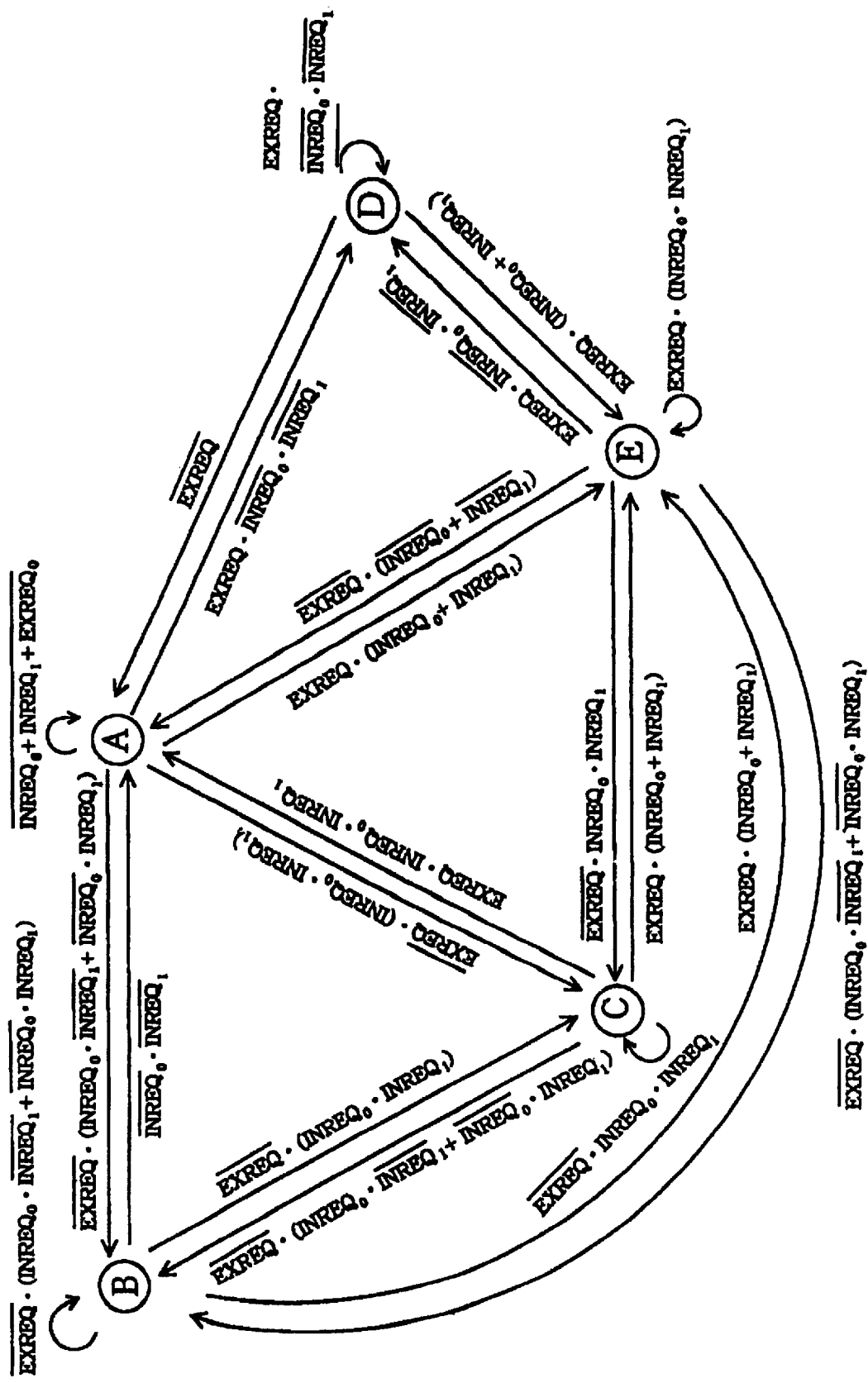
FIG. 18 represents a relationship between transitions of 5 states, the respective bit values $INREQ_0$ to $INREQ_1$ of an internal request signal INREQ, and a value of an external request signal in the second information processing apparatus.

Now, FIG. 18 illustratively shows a relationship among the transitions of the above-described 5 conditions, the respective bit values $INREQ_0$ to $INREQ_1$ of the 2-bit internal request signal INREQ, and also the value of the external request signal EXREQ. In FIG. 18, a bit to which symbol "/" is not given implies that the value of this bit is equal to "1", namely active state. Another bit to which symbol "/" is given implies that the value of this bit is equal to "0", namely non-active state. Symbol "+" indicates OR, and symbol "." indicates AND.

Also, the bus controller 73 supplies a data select signal "DST" to the external bus controller 64. This data select signal DST indicates as to whether the data is transferred from the external device to the CPU 62, or the DMAC 63. For example, when the value of the data select signal DST is equal to "1", the bus controller 73 instructs the data transfer between the DMAC 63 and the external device. When the value of the data select signal DST is equal to "0" the bus controller 73 instructs the data transfer between the CPU 62 and the external device.

In response to a 4-bit internal request signal IREQ, and a 4-bit external request signal EREQ and the like, the DMAC 63 produces the above-described internal request signal INREQ and external request signal EXREQ, and then supplies these produced internal/external request signals to the bus controller 73. The 4-bit internal request signal IREQ is constituted by internal request signals $IREQ_0$ to $IREQ_3$ for requesting a release of the internal buses 29 and 30, or the external bus 65, and these internal request signals are supplied from the four I/O devices such as the timer 25. The 4-bit external request signal EREQ indicates that the internal buses 29 and 30, or the external bus 65 are requested to be released, and is supplied from an external signal source. Also, since an internal acknowledge signal INACK, or an external acknowledge signal EXACK is supplied from the bus controller 73 to the DMAC 63, this DMAC 63 controls DMA-transfer operations of data among these I/O devices such as the internal memory 24 and the timer 25, or DMA-transfer operations of data among the respective addresses of the internal memory 24, or between the internal I/O device and the external I/O device.

It should be noted that bus controllers are provided in the I/O devices such as the internal memory 24 and the timer 25. The bus controllers control to connect/disconnect between either the internal bus 29 or the internal bus 30. When the internal request signal INREQ becomes an inactive state, the CPU 62 controls all of the bus controllers. When the internal request signal INREQ becomes an active state, the DMAC 63 controls all of the bus controllers including the bus controller 73 employed in the CPU 62.

INTERNAL ARRANGEMENT OF DMAC

Figure 19:
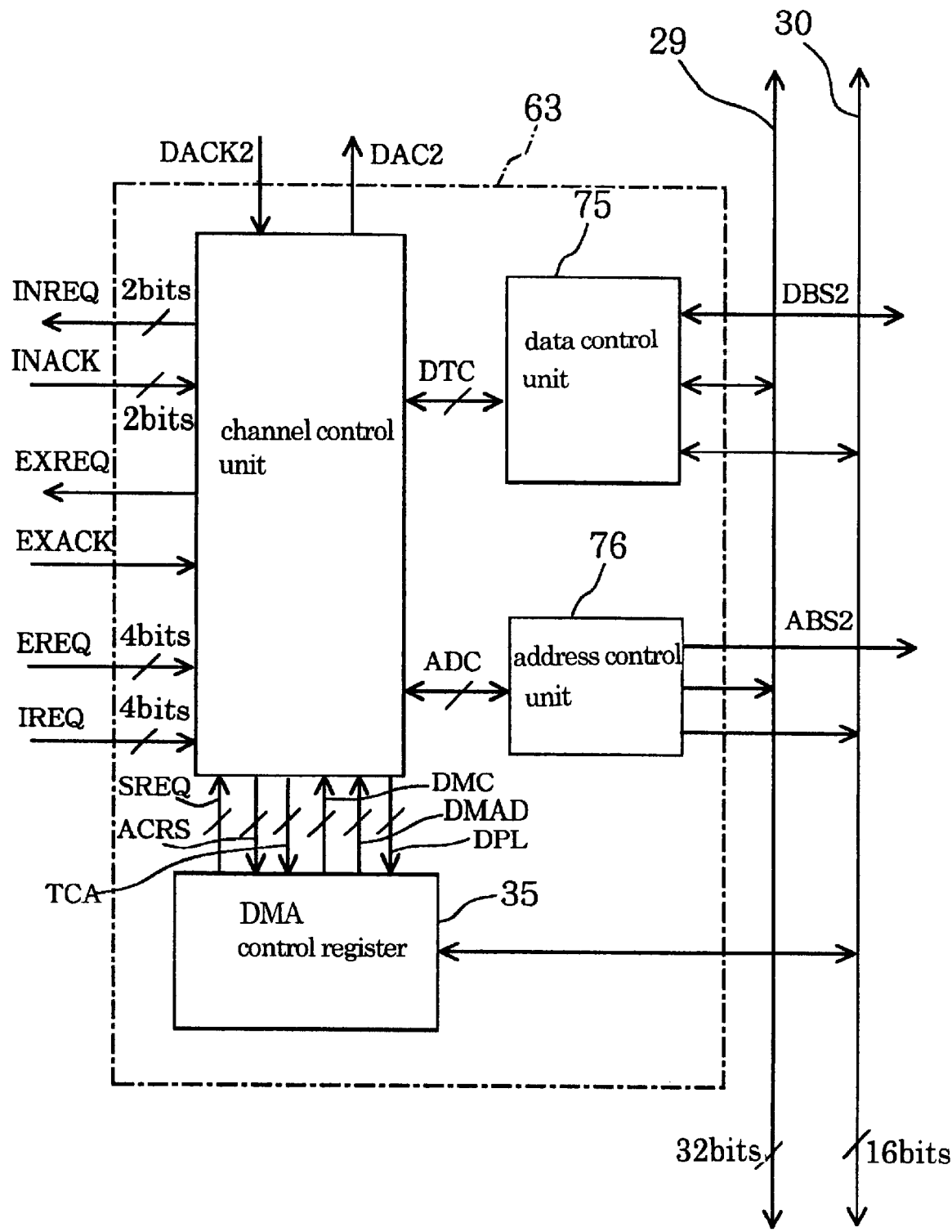
FIG. 19 is a schematic block diagram for showing an internal arrangement of a DMAC (direct memory access controller) employed in the second information processing apparatus shown in FIG. 16.

An internal arrangement of the above-described DMAC 63 will then be explained with reference to FIG. 19. It should also be noted that the same reference numerals shown in FIG. 2 will be employed as those for denoting the same, or similar structural elements of FIG. 19, and descriptions thereof are omitted. The DMAC 63 shown in this drawing is arranged by newly employing a channel control unit 74, a data control unit 75, and an address control unit 76, while substituting the channel control unit 32, the data control unit 33, the address control unit 34, and the DMA control register 35 indicated in FIG. 2.

Figure 20:
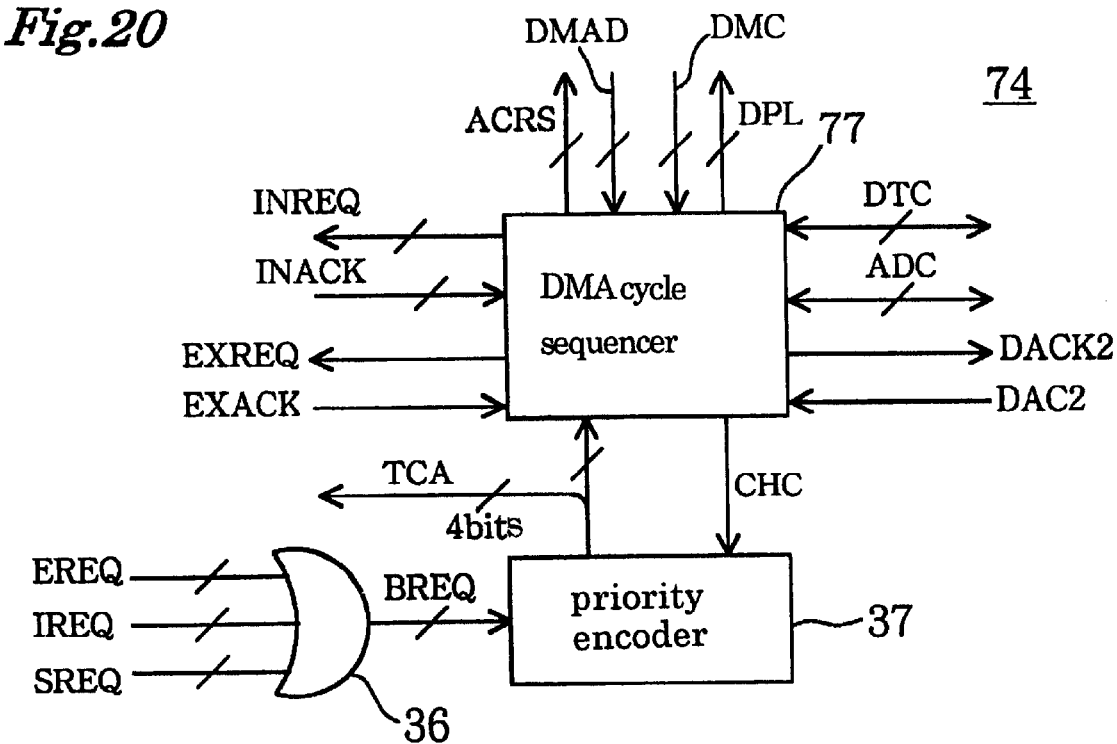
FIG. 20 is a schematic block diagram for indicating an internal arrangement of a channel control unit employed in the second information processing apparatus.

As indicated in FIG. 20, the channel control unit 74 is mainly arranged by an OR gate 36, a priority encoder 37, and a DMA cycle sequencer 77. Since the circuit arrangements of this channel control unit 74 other than the DMA cycle sequencer 77 are similar to those of the channel control unit 32 shown in FIG. 3, descriptions thereof are omitted.

When a channel validity signal TCA is inputted into the DMA cycle sequencer 77, this DMA cycle sequencer 77 supplies an address counter read strobe ACRS to the DMA control register 35 so as to receive the supply of a DMA address signal DMAD and the supply of a DMA control signal DMC from the channel of the DMA control register 35 which is validated by the channel validity signal TCA. Next, the DMA cycle sequence 77 decodes both a source address SAD and a destination address DAD indicated by the DMA address signal DMAD so as to judge which DMA transfer operation is carried out. Then, this DMA cycle sequencer 77 outputs either the internal request signal INREQ or the external request signal EXREQ responding to this judgement by way of the DMA cycle indicated by the DMA control signal DMC to the bus controller 73 of the CPU 62. Then, when either the internal acknowledge signal INACK or the external acknowledge signal EXACK is supplied from the bus controller 73, the DMA cycle sequencer 77 produces a data control signal DTC and an address control signal ADC. The data control signal DTC instructs the data input/output to the internal buses 29 and 30, or the external bus 65. The address control signal ADC instructs the address output to the internal buses 29 and 30, or the external bus 65. The DMA cycle sequencer 77 supplies the produced data control signal DTC and the produced address control signal ADC to the data control unit 75 and the address control unit 76, respectively.

When the external acknowledge signal EXACK is supplied to the DMA cycle sequencer 77, this DMA cycle sequencer 77 supplies the second data access control signal DAC 2 to the external bus controller 64 before producing both the data control signal DTC and the address control signal ADC, and is brought into a waiting state until the second data acknowledge signal DACK 2 from the external bus controller 64.

Also, the DMA cycle sequencer 77 supplies both a displacement value "α" and a value "β" to be subtracted from a byte count value BC as a displacement signal "DPL" to the DMA control register 35.

The internal arrangement of the data control unit 75 and the internal arrangement of the address control unit 76 are basically similar to those of the above-described data control unit 33 and address control unit 34. Moreover, a second data bus DBS 2 and a second address bus ABS 2 are newly provided with the data control unit 33 and the address control unit 34, respectively. These buses DBS 2 and ABS 2 are used to connect these control units 75/76 via these buses DBS 2/ABS 2 to the external bus controller 64.

INTERNAL ARRANGEMENT OF EXTERNAL BUS CONTROLLER

Figure 21:
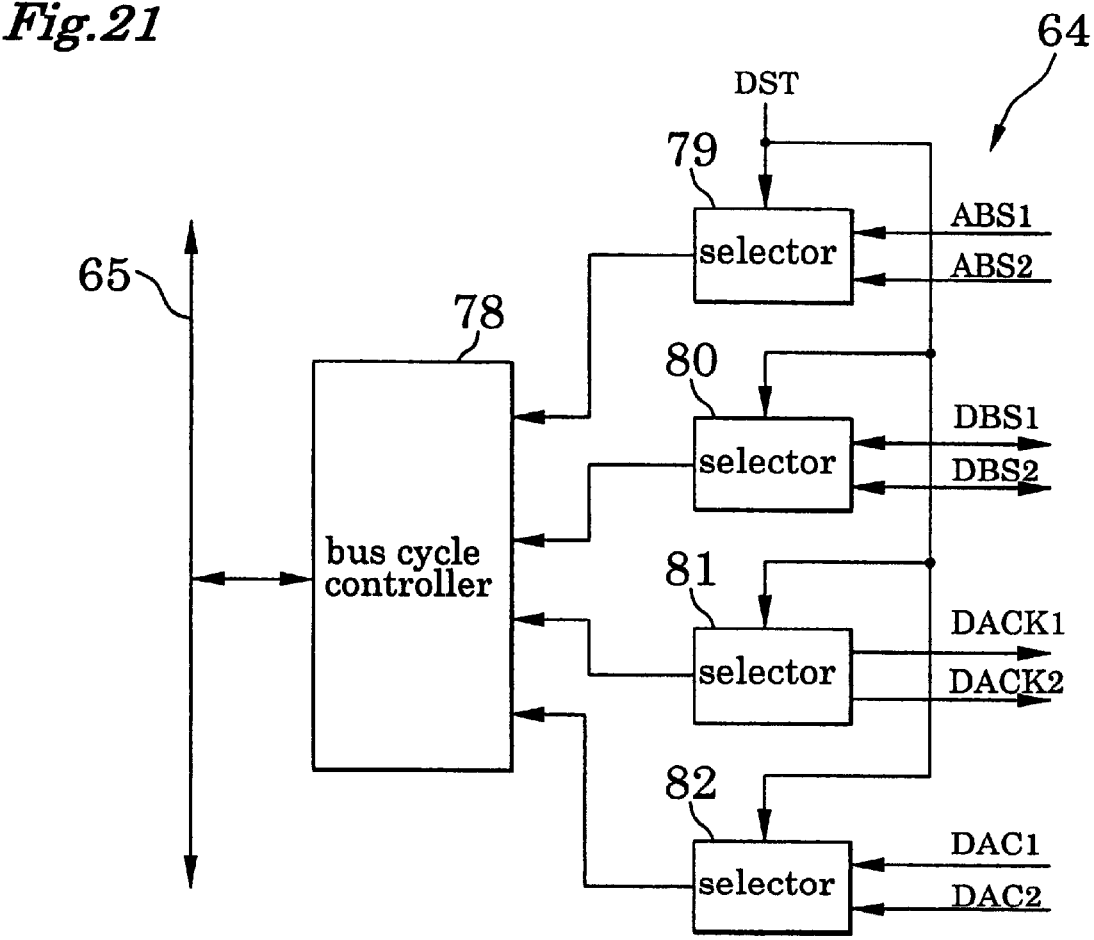
FIG. 21 is a schematic block diagram for showing an internal arrangement of an external bus controller employed in the second information processing apparatus.

As shown in FIG. 21, the external bus controller 64 is mainly arranged by a bus cycle controller 78, and also four sets of selectors 79 to 82.

An address supplied via the first address bus ABS 1 from the CPU 62 is entered into a first input terminal of the selector 79, an address supplied via the second address bus ABS 2 from the DMAC 63 is entered into a second input terminal of this selector 79, and any one of these supplied addresses is supplied from this selector 79 in response to the value of the data selection signal DST. A first input/output terminal of the selector 80 is connected to the first data bus DBS 1, a second input/output terminal of this selector 80 is connected to the second data bus DBS 2, and a third input/output terminal thereof is connected to the bus cycle control 78. In response to the value of the data selection signal DST, the bus cycle controller 78 is connected to either the first data bus DBS 1 or the second data bus DBS 2. In response to the value of the data selection signal DST, the selector 81 outputs the data acknowledge signal DACK derived from the bus cycle controller 78 as either a first data acknowledge signal DACK 1 or a second data acknowledge signal DACK 2. Then, either the first data acknowledge signal DACK 1 or the second acknowledge signal DACK 2 is supplied to either the CPU 62 or the DMAC 63.

OPERATIONS OF SECOND INFORMATION PROCESSING APPARATUS

Figure 22:
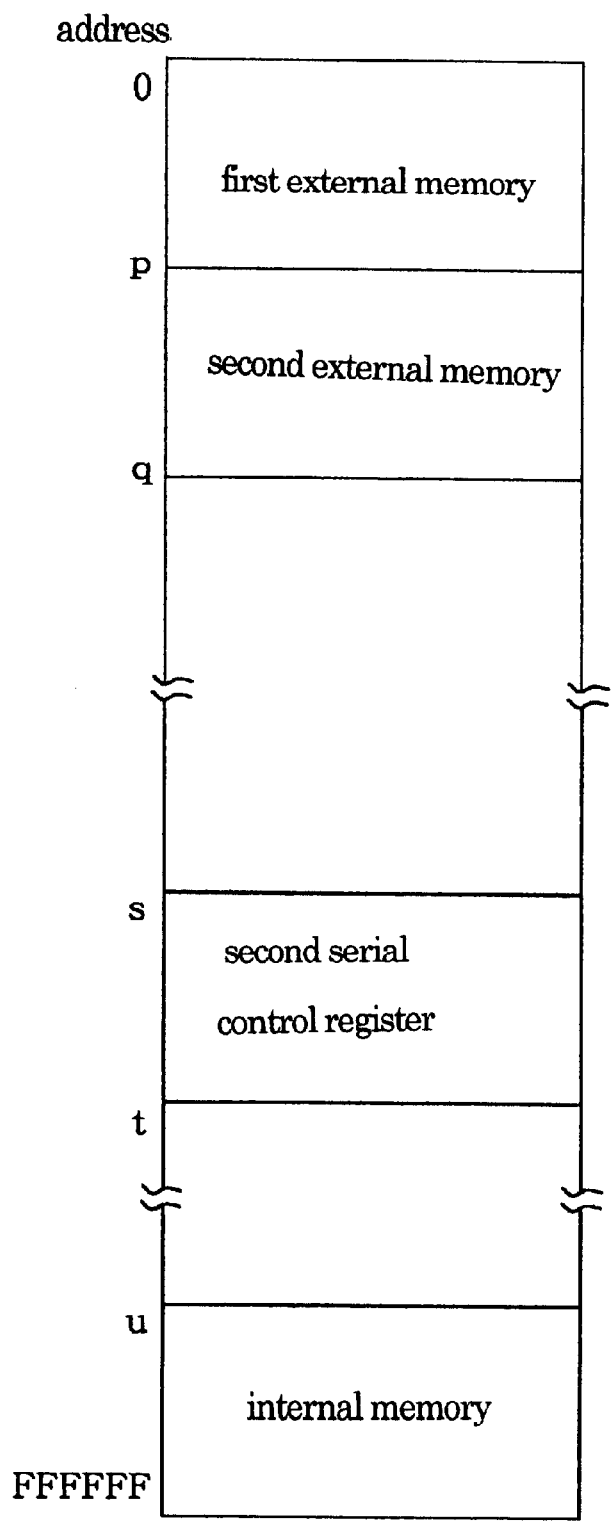
FIG. 22 schematically represents a structure of a memory map employed in the second information processing apparatus.

Next, various operations of the second information processing apparatus 61 with the above-described arrangement will be described. First, it is now assumed that a structure of a memory map of this second information processing apparatus 61 is indicated in FIG. 22. In FIG. 22, addresses "0" to "p–1" are allocated to the first external memory 66; addresses "p" to "(q–1)" are allocated to the second external memory 67; addresses "s" to "(t–1)" are allocated to a second serial control register for constituting the second serial interface 28; and addresses "u" to "FFFFFF" are allocated to the internal memory 24.

Then, in this embodiment, the following assumption is made. That is, the CPU 62 executes a printer control program stored in the first external memory 66, and once DMA-transfers an outline font stored in the second external memory 67 into the internal memory 24. Thereafter, this CPU 62 expands bitmap data to the internal memory 24. Finally, the CPU 62 DMA-transfers the bitmap data via the second serial interface 28 to the serial interface 71 of the printer 70, so that this printer 70 prints out the content of the bitmap data in response to this expanded bitmap data. In this case, at a stage when the CPU 62 starts the printer control, the conditions of the internal buses 29/30 and of the external bus 65 are recognized as a condition "A", and the bus request signal BREQ is not brought into the active state.

It should be understood that when operations of the respective arrangements in the second embodiment are similar to those of the first embodiment, detailed descriptions thereof are omitted.

When the CPU 62 fetches a command code of the printer control program stored in the first external memory 66 after releasing the system reset, the CPU 62 commences the printer control. First, the CPU 62 DMA-transfers the outline font stored in the second external memory 67 to the internal memory 24. In this case, the CPU 62 transfers the address "p" of the second external memory 67 equal to a source as a source address SAD via the internal bus 30 to the DMAC 63. The CPU 62 transfers the address "u" of the internal memory 24 equal to a destination as a destination address DAD via the internal bus 30 to the DMAC 63. The CPU 62 transfers a transfer number corresponding to a size of outline font data which should be transferred as the byte count value BC via the internal bus 30 to the DMAC 63. The CPU 62 transfers other software transfer requests, the type/mode of DMA transfer operation, the displacement value "α", and the value "β" to be subtracted from the byte count value BC via the internal bus 30 to the DMAC 63.

As a result, the DMAC 63 decodes the source address SAD and the destination address DAD indicated by the DMA address signal DMAD so as to judge that the DMA transfer operation is carried out from the second external memory 67 to the internal memory 24. Then, the DMAC 63 supplies both the external request signal EXREQ and the internal request signal INREQ to the bus controller 73 of the CPU 62 based upon the judgment result. In this case, since the DMAC 63 is required to fetch the internal bus 29 and the external bus 65, the DMAC 63 sets the external request signal EXREQ and the bit $INREQ_0$ of the internal request signal INREQ into active states in order to transfer the condition "A" shown in FIG. 18 to the condition "E", and also sets the bit $INREQ_1$ of the internal request signal INREQ into a non-active state.

Based upon the internal request signal INREQ, the external request signal EXREQ, and the operating condition of the CPU 62 supplied from the DMAC 63, the bus controller 73 makes a similar judgment to that of the flow chart shown in FIG. 9. Thereafter, when the internal bus 29 and the external bus 65 are released, this bus controller 73 supplies an internal acknowledge signal INACK and an external acknowledge signal EXACK, which indicate this bus release, to the DMAC 63. Also, the bus controller 73 supplies a data selection signal DST having a value of "1", namely a data transfer operation executed between the DMAC 63 and the external device, to the external bus controller 64.

Then, when the internal acknowledge signal INACK and the external acknowledge signal EXACK are supplied from the bus control 73, the DMAC 63 supplies the second data access control signal DAC 2 to the external bus controller 64.

When the second data acknowledge signal DACK 2 is supplied from the external bus controller 64 is supplied from the external bus controller 64, since both the internal bus 29 and the external bus 65 can be used, the DMAC 63 supplies the sequentially updated read addresses via the external bus controller 64 and the external bus 65 into the second external memory 67, and further supplies the sequentially updated write addresses via the internal bus 29 into the internal memory 24. As a result, the DMAC 63 reads out the outline font stored in the external memory 67 via the external bus 65 and the external bus controller 64 to execute the DMA transfer operation via the internal bus 29 to the internal memory 24 until the byte count value BC becomes "0".

Next, the CPU 62 opens the outline font stored in the internal memory 24 to expand the bitmap data on the internal memory 24. In this case, this condition is assumed as the condition A.

Since the above-described operation of the CPU 62 corresponds to the data transfer operation between the respective addresses of the internal memory 24, this data transfer operation may be carried out without any control of this CPU 62 in the DMA transfer mode. In this case, the above-described condition E is transferred to such a condition B that only the internal bus 29 is released. In this case, the operating rate of the CPU 62 may be furthermore increased.

Next, the bitmap data expanded in the internal memory 24 is DMA-transferred to the second serial interface 28. Also, in this case, the CPU 62 transfers via the internal bus 30 to the DMAC 63, the address of the internal memory 24 corresponding to the source as the source address, where the bitmap data is stored. The CPU 62 transfers the address "s" of the second serial control register for constituting the second serial interface 28 equal to the destination as the destination address DAD via the internal bus 30 to the DMAC 63. The CPU 62 transfers a transfer number corresponding to an amount of bitmap data which should be transferred as the byte count value BC via the internal bus 30 to the DMAC 63. The CPU 62 transfers other software transfer requests, the type/mode of DMA transfer operation, the displacement value "α", and the value "β" to be subtracted from the byte count value BC via the internal bus 30 to the DMAC 63.

As a result, the DMAC 63 decodes the source address SAD and the destination address DAD indicated by the DMA address signal DMAD so as to judge that the DMA transfer operation is carried out from the internal memory 24 to the second serial interface 28. Then, the DMAC 63 supplies the internal request signal INREQ to the bus controller 73 of the CPU 62 based upon the judgment result. In this case, since the DMAC 63 is required to fetch the internal bus 29 and the internal bus 30, the DMAC 63 sets the bits $INREQ_0$ and $INREQ_1$ of the internal request signal INREQ into active states in order to transfer the condition "B", or condition "A" shown in FIG. 18 to the condition "C", and also sets the external request signal EXREQ into a non-active state.

Based upon the internal request signal INREQ, the external request signal EXREQ, and the operating condition of the CPU 62 supplied from the DMAC 63, the bus controller 73 makes a similar judgment to that of the flow chart shown in FIG. 9. Thereafter, when the internal bus 29 and the internal bus 30 are released, this bus controller 73 supplies an internal acknowledge signal INACK and an external acknowledge signal EXACK, which indicate this bus release, to the DMAC 63.

Then, when the internal acknowledge signal INACK and the external acknowledge signal EXACK are supplied from the bus control 73, since both the internal bus 29 and the internal bus 30 can be used, the DMAC 63 supplies the sequentially updated read addresses via the internal bus 29 into the internal memory 24, and further supplies the sequentially updated write addresses via the internal bus 30 into the second serial interface 28. As a result, the DMAC 63 reads out the bitmap data stored in the internal memory 24 via the internal bus 29 to execute the DMA transfer operation via the internal bus 30 to the second serial interface 28 until the byte count value BC becomes "0".

In the above-explained second embodiment, one software transfer request signal SREQ is inputted into the DMAC 63. When a plurality of internal request signals IREQs, a plurality of external request signals EREQs, or a plurality of software transfer request signals EREQs are entered into the DMAC 63, operations in accordance with the priority orders thereof are similar to those of the first embodiment. Therefore, a detailed description of the operations according to the second embodiment is omitted. Although the second embodiment does not specifically describe operations in the various types of DMA transfer operations and the various modes thereof, since these operations are similar to those of the first embodiment, a detailed description thereof is omitted.

VARIOUS RELATIONSHIPS BETWEEN TRANSITIONS OF BUS CONDITIONS AND VARIOUS SIGNALS

Referring to timing charts indicated in FIG. 23 to FIG. 25, a description will be made of relationships between transitions of various bus conditions and various signals such as the internal request signal INREQ.

Figure 23:
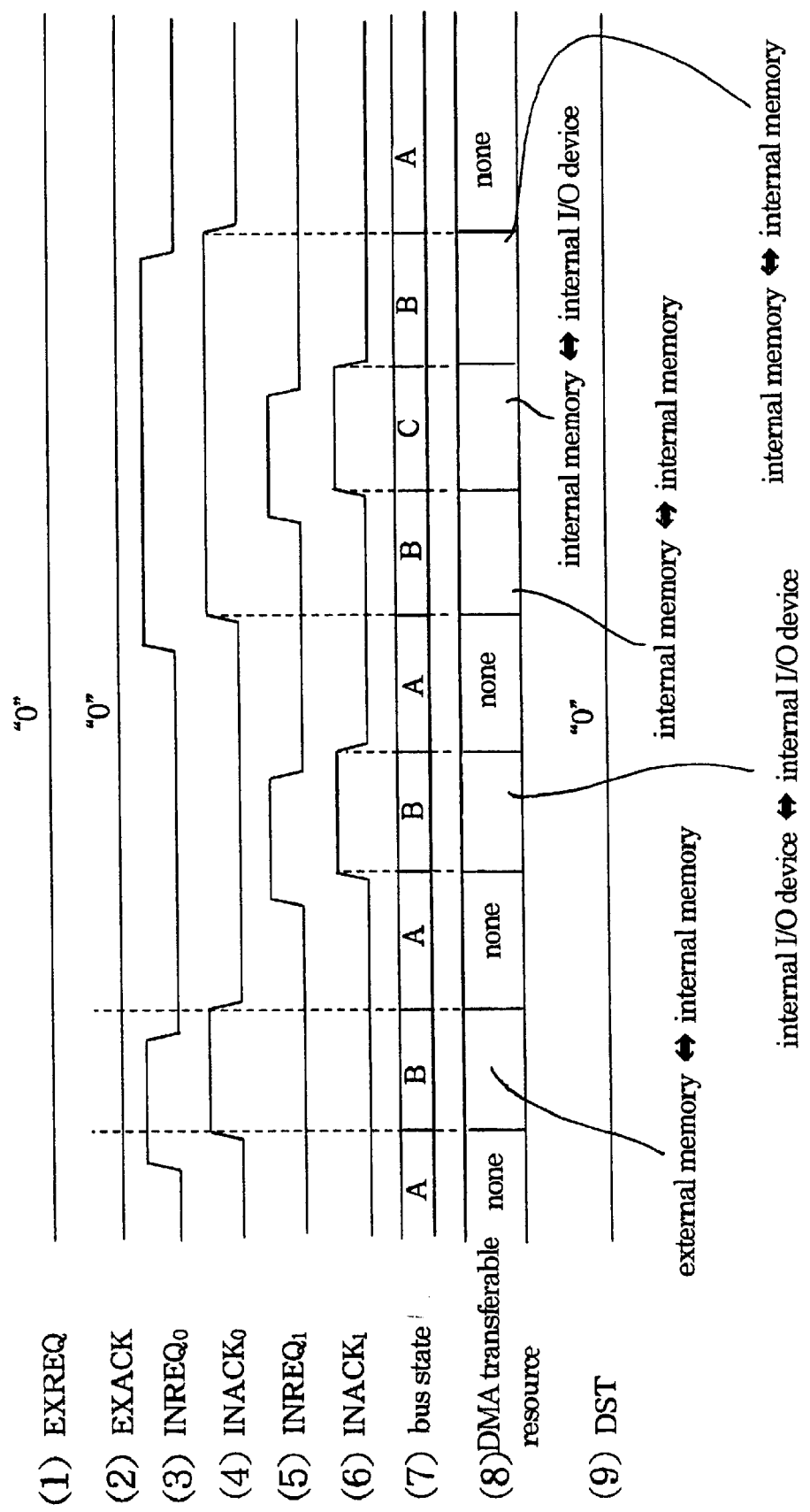
FIG. 23 is a timing chart for representing an example of a relationship between the respective signals and transitions of the respective bus states in the second information processing apparatus.

FIG. 23 is such a timing chart for indicating a DMA transfer operation by utilizing the internal buses 29 and 30. In other words, as represented in FIG. 23(8), in the case that the DMAC 63 performs the DMA transfer operation between the storage areas of the internal memory 24 defined at the respective addresses, between the internal memory 24 and each of the internal I/O devices, or between the respective internal I/O devices, this DMAC 63 is requested to release either the internal bus 29 or the internal bus 30. As indicated in FIG. 23(7), an occupation condition of the internal bus is requested to be transferred among a condition A, a condition B, and a condition C.

As a consequence, in order to transfer the occupation condition of this internal bus among the condition A, the condition B, and the condition C, this DMAC 63 sets the external request signal EXREQ to a non-active state and also sets the respective bits $INREQ_0$ and $INREQ_1$ of the internal request signal INREQ to either active states or non-active states, and then supplies the set external request signal EXREQ and the set internal request signal INREQ to the bus controller 73 (see FIG. 23(1), FIG. 23(3) and FIG. 23(5)).

Accordingly, the bus controller 73 judges which internal bus is requested to be released based upon the states of the respective bits $INREQ_0$ and $INREQ_1$ of the internal request signal INREQ and also the state of the external request signal EXREQ. In such a case that the DMAC 63 allows releasing of the relevant internal bus, this bus controller 73 sets the external acknowledge signal EXACK to a non-active state and also sets the respective bits $INACK_0$ and $INACK_1$ of the internal acknowledge signal INACK to either active states or non-active states so as to indicate this bus releasing permission. Then, this bus controller 73 supplies the set external acknowledge signal EXACK and the set internal acknowledge signal INACK to the DMAC 63 (see FIG. 23(2), FIG. 23(4) and FIG. 23(6)). Also, this bus controller 73 sets the data selection signal DST to a non-active state, and then supplies the set data selection signal DST to the external bus controller 64 (see FIG. 23(9)).

Figure 24:
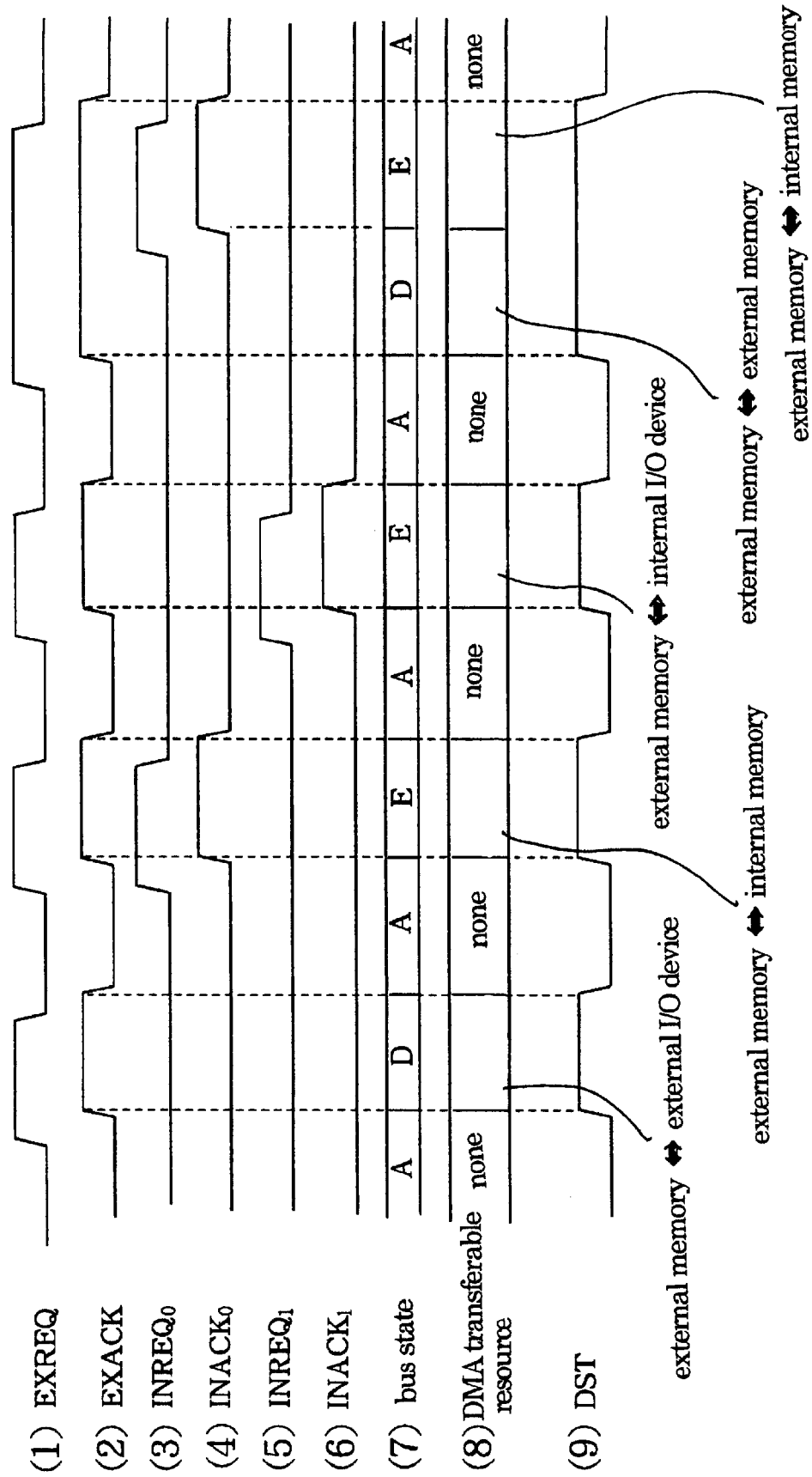
FIG. 24 is a timing chart for representing an example of a relationship between the respective signals and transitions of the respective bus states in the second information processing apparatus.

FIG. 24 indicates such a DMA transfer operation while mainly using the external bus 65. In other words, as indicated in FIG. 24(8), in the case that the DMAC 63 performs the DMA transfer operation between the first/second external memories 66/67 and the external I/O device; between the first/second external memories 66/67 and the internal memory 24; between the first/second external memories 66/67 and the internal I/O device; or between the first external memory 66 and the second external memory 67, this DMAC 63 is required to release the external bus 65, and either the internal bus 29 or the internal bus 30. As indicated in FIG. 24(7), an occupation condition of the relevant bus is requested to be transferred among a condition A, a condition D, and a condition E.

As a consequence, in order to transfer the occupation condition of this bus among the condition A, the condition D, and the condition E, this DMAC 63 sets the external request signal EREQ to an active state and also sets the respective bits $INREQ_0$ and $INREQ_1$ of the internal request signal INREQ to either active states or non-active states, and then supplies the set external request signal EXREQ and the set internal request signal INREQ to the bus controller 73 (see FIG. 24(1), FIG. 24(3) and FIG. 24(5)).

Accordingly, the bus controller 73 judges which bus is requested to be released based upon the states of the respective bits $INREQ_0$ and $INREQ_1$ of the internal request signal INREQ and also the state of the external request signal EXREQ. In such a case that the DMAC 63 allows releasing of the relevant bus, this bus controller 73 sets the external acknowledge signal EXACK to an active state and also sets the respective bits $INACK_0$ and $INACK_1$ of the internal acknowledge signal INACK to either active states or non-active states so as to indicate this bus releasing permission. Then, this bus controller 73 supplies the set external acknowledge signal EXACK and the set internal acknowledge signal INACK to the DMAC 63 (see FIG. 24(2), FIG. 24(4) and FIG. 24(6)). Also, this bus controller 73 sets the data selection signal DST to an active state, and then supplies the set data selection signal DST to the external bus controller 64 (see FIG. 24(9)).

Figure 25:
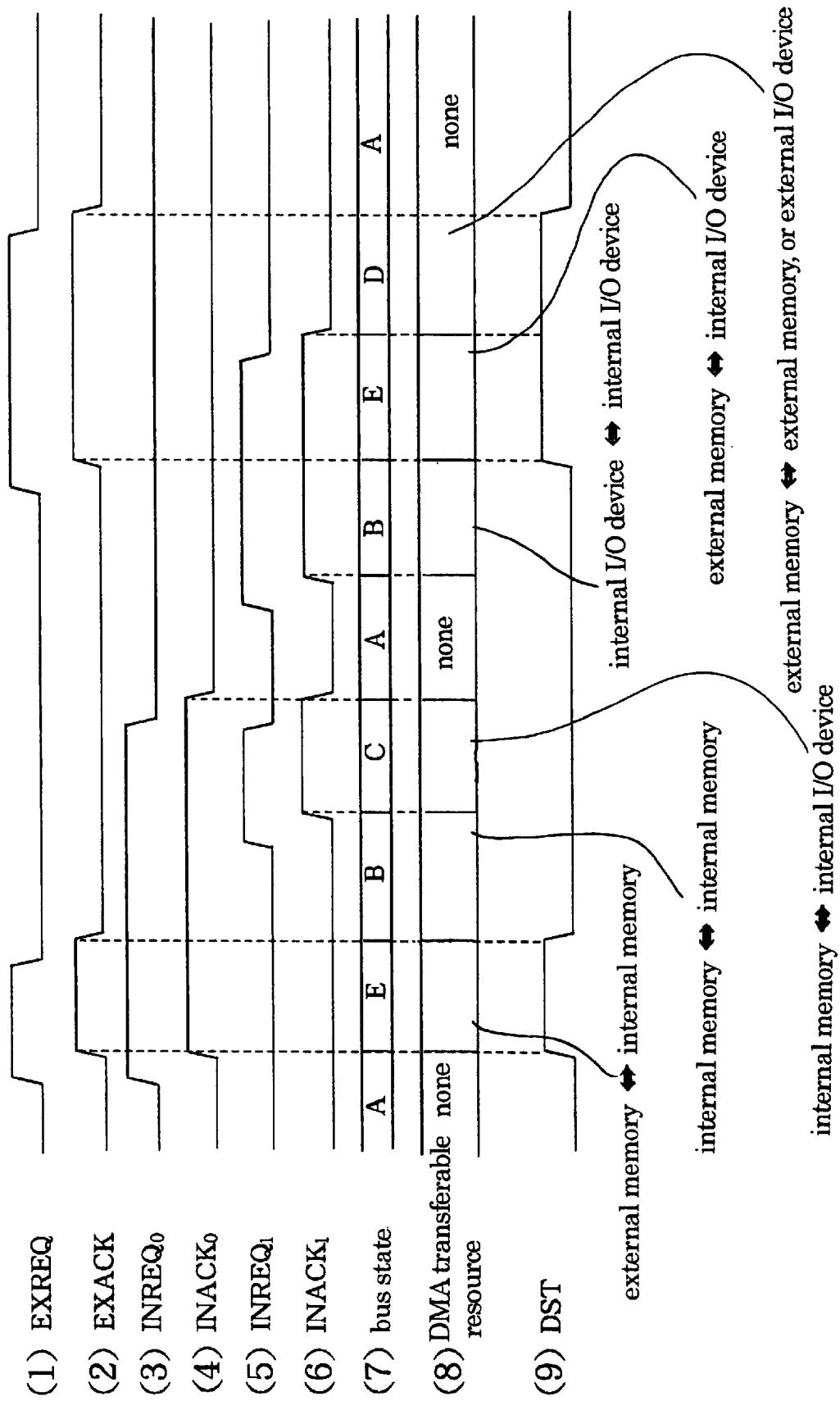
FIG. 25 is a timing chart for representing an example of a relationship between the respective signals and transitions of the respective bus states in the second information processing apparatus.

FIG. 25 shows such a DMA transfer operation when the internal buses 29 and 30, and also the external bus 65 are employed. That is to say, as represented in FIG. 25(8), in the case that the DMAC 63 executes the DMA transfer operation between the first/second external memories 66/67 and the internal memory 24; between the storage areas of the internal memory 24 defined at the respective addresses; between the internal memory 24 and the respective internal I/O devices; between the internal I/O devices; between the first/second external memories 66/67 and the internal I/O device; between the first/second external memories 66/67 and the external I/O device; or between the first external memory 66 and the second external memory 67, this DMAC 63 is required to release the external bus 65, and the internal buses 29 and 30. As indicated in FIG. 25(7), an occupation condition of the bus is requested to the transferred among a condition A, a condition B, a condition C, a condition D, and also a condition E.

As a consequence, in order to transfer the occupation condition of these buses among the condition A to the condition E, this DMAC 63 sets the external request signal EXREQ to an active state, or a non-active state, and also sets the respective bits $INREQ_0$ and $INREQ_1$ of the internal request signal INREQ to either active states or non-active states, and then supplies the set external request signal EXREQ and the set internal request signal INREQ to the bus controller 73 (see FIG. 25(1), FIG. 25(3) and FIG. 25(5)).

Accordingly, the bus controller 73 judges which bus is requested to be released based upon the states of the respective bits $INREQ_0$ and $INREQ_1$ of the internal request signal INREQ and also the state of the external request signal EXREQ. In such a case that the bus controller 73 allows releasing of the relevant bus, this bus controller 73 sets the external acknowledge signal EXACK to either an active state or a non-active state and also sets the respective bits $INACK_0$ and $INACK_1$ of the internal acknowledge signal INACK to either active states or non-active states so as to indicate this bus releasing permission. Then, this bus controller 73 supplies the set external acknowledge signal EXACK and the set internal acknowledge signal INACK to the DMAC 63 (see FIG. 25(2), FIG. 25(4) and FIG. 25(6)).

Also, this bus controller 73 sets the data selection signal DST to either an active state or a non-active state, and then supplies the set data selection signal DST to the external bus controller 64 (see FIG. 25(9)).

OVERALL ARRANGEMENT OF THIRD INFORMATION PROCESSING APPARATUS

Figure 26:
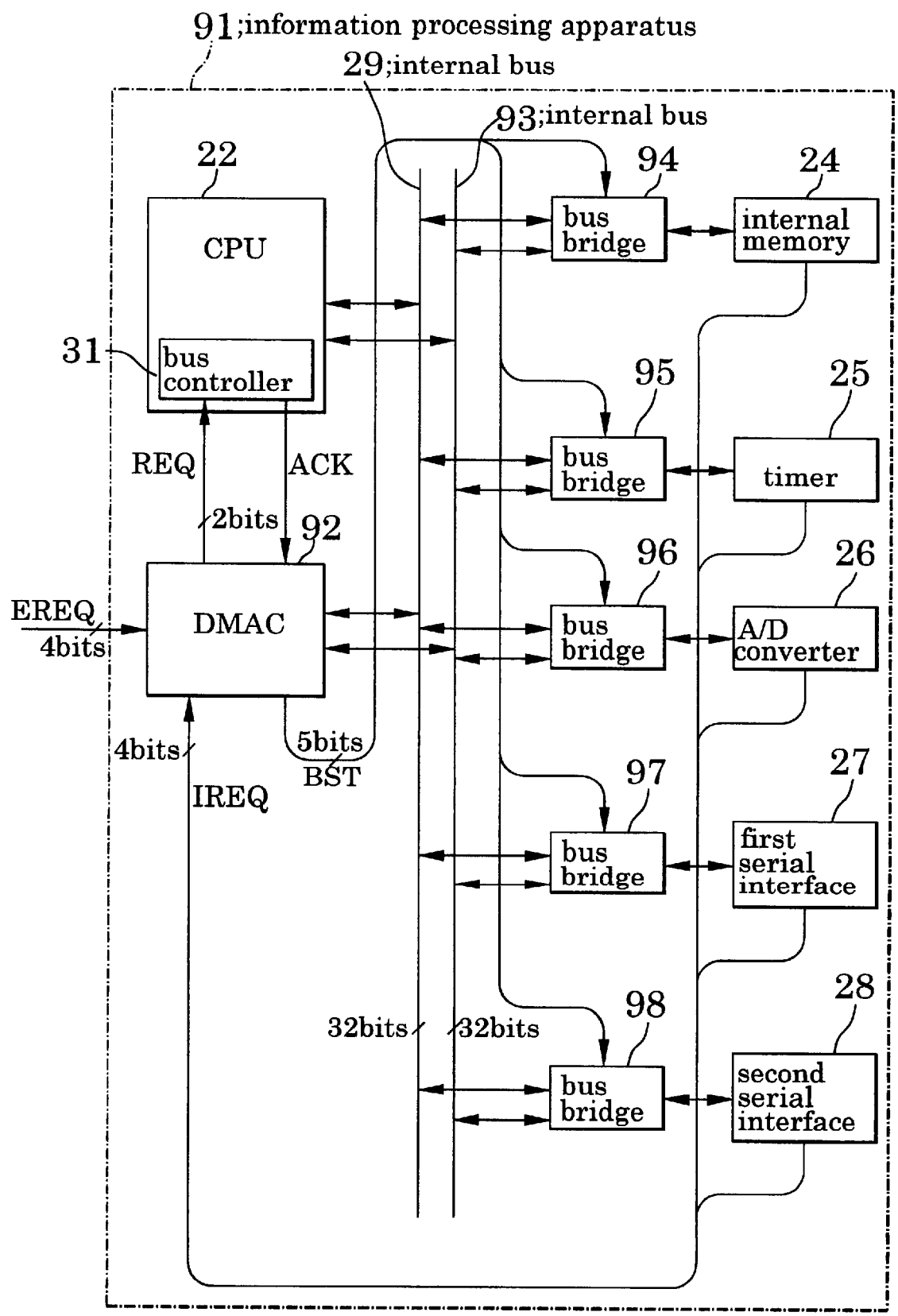
FIG. 26 is a schematic block diagram for showing an arrangement of an information processing apparatus according to a third embodiment of the present invention.
Figure 27:
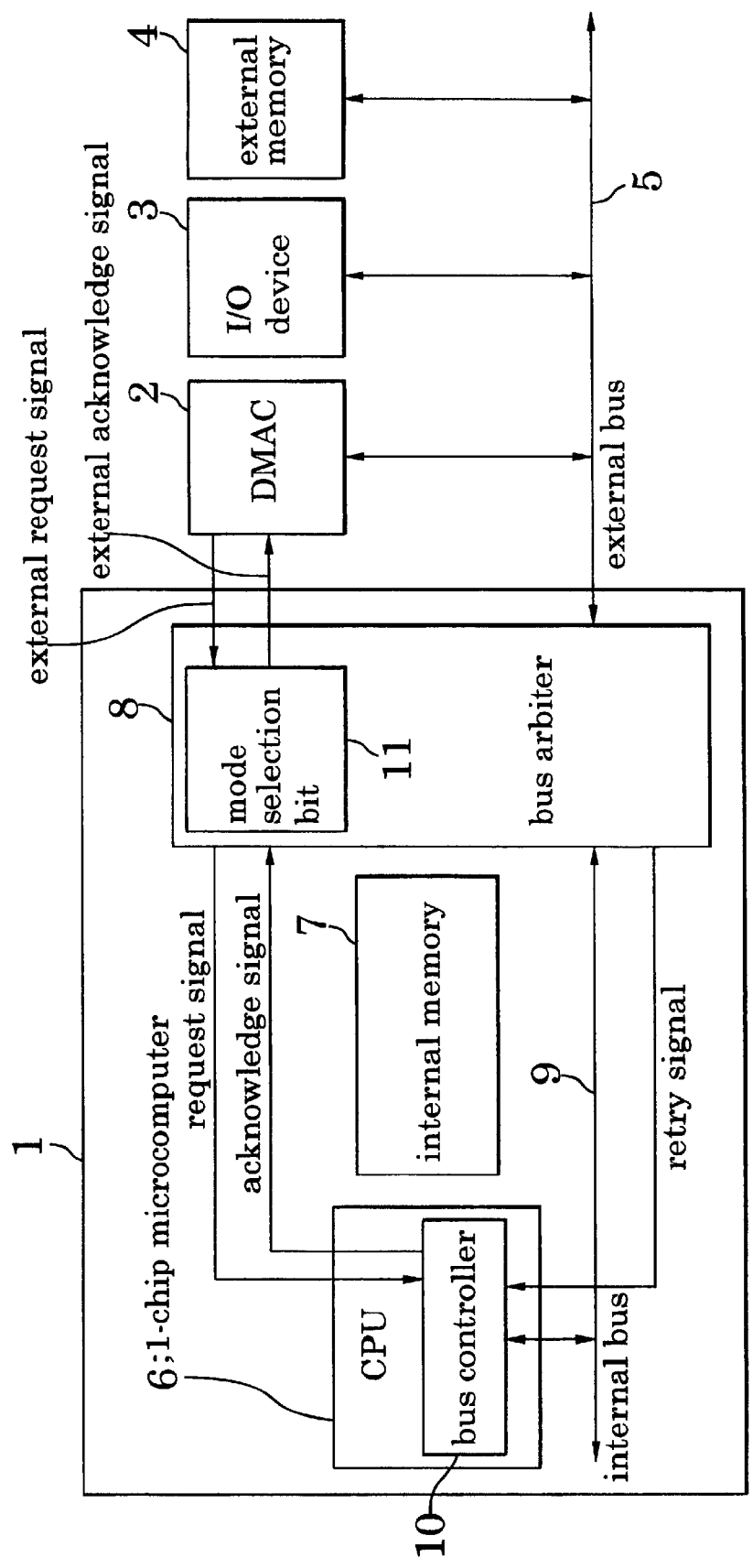
FIG. 27 is a schematic block diagram for indicating the arrangement of the conventional information processing apparatus.

FIG. 26 is a schematic block diagram for indicating an overall arrangement of an information processing apparatus 91 according to a first embodiment of the present invention. It should be noted that the same reference numerals shown in FIG. 1 will be employed as those for representing the same, or similar structural elements indicated in FIG. 26. In the third information processing apparatus 91 shown in this drawing, both a DMAC (direct memory access controller) 92 and an internal bus 93 are newly provided instead of the above-explained DMAC 23 and internal bus 30 indicated in FIG. 1. This internal bus 93 is capable of transferring 32-bit data, and owns the same function as that of the internal bus 29. Also, both input/output terminals of an internal memory 24 and input/output terminals of an I/O device such as a timer 25 are connected via bus bridges 94 to 98 to the internal buses 29 and 93. The DMAC 92 owns the same function as that of the above-descried DMAC 23, and further the following function. That is, before starting a DMA transfer operation, this DMAC 92 outputs a 5-bit bus bridge control signal BST so as to control these bus bridges 94 to 98, so that either the internal memory 24 or the I/O device such as the timer 25 is connected to either the internal bus 29 or the internal bus 93 in accordance with the source and destination of the DMA transfer operation.

With employment of the above-explained arrangement, in accordance with the third information processing apparatus 91, the operating rate of the CPU 22 can be further increased, and also both the internal buses 29 and 93 can be effectively utilized. The above-described specific arrangement may be apparently applied to the second information processing apparatus 61 shown in FIG. 17. That is, two sets of the above-explained internal buses have the same function, and the bus bridges 94 to 98 are controlled so as to connect either the internal memory 24 or the I/O device such as the timer 25 to either the internal bus 29 or the internal bus 93.

While the present invention has been described with reference to the drawings, the present invention is not limited to these concrete arrangements/structures, but may be modified, changed, or substituted without departing from the technical spirit and scope of the present invention.

For instance, the present invention is not limited to the sorts and combinations of the internal I/O devices and of the external I/O devices as described in the above-described embodiments. Other sorts and combinations may be similarly employed. Also, the present invention is not limited to the above-explained connections between the internal/external I/O devices and any of the internal buses.

Also, the second embodiment describes such an example that the external bus 65 is connected via the external bus controller 64 to the CPU 62 and the DMAC 63 so as to use the internal buses 29/30 and the external bus 65 in the parallel manner. Apparently, the present invention is not limited to this example. Alternatively, for instance, an external bus controller may be employed in order to connect either the internal bus 29 or the internal bus 30 to the external bus in a series manner.

Furthermore, in the above-described embodiments, the internal request signal IREQ, the external request signal EREQ, and the software transfer request signal SREQ are supplied as the bus request signal BREQ via the OR gate 36 to the priority encoder 37 shown in FIG. 3 and FIG. 20. As a result, the priority encoder 73 cannot judge which sort of request signal is supplied. The present invention is not limited to this circuit arrangement. Alternatively, for instance, priority orders may be separately set to the internal request signal IREQ, the external request signal EREQ, and the software transfer request signal SREQ. In such an alternative case that plural different sorts of request signals are supplied within a preselected time period, such a selection means capable of selectively outputting a request signal with a higher priority may be provided instead of the OR gate 36.

Any of the above-explained embodiments describes such an example that all of one data bus are fetched. However, the present invention is not limited to this example. Alternatively, while a plurality of gates may be provided with the respective data buses, either the CPU or the DMAC may control turning ON/OFF of these plural gates. As a result, the DMAC may fetch only necessary portions of the relevant data bus so as to perform the DMA transfer operation. As an alternative example applied to the arrangement shown in FIG. 1, when the DMA transfer operation is carried out between the first serial interface 27 and the second serial interface 28, since the portions with the internal bus 30 are not used to which the internal memory 24, the timer 25, and the A/D converter 26 are connected, a gate is provided between the A/D converter 26 and the first serial interface 27. Then, the DMAC 23 closes this gate to fetch only such a portion of this internal bus 30, to which both the first serial interface 27 and the second serial interface 28 are connected, so that the DMA transfer operation may be performed whereas the CPU 22 may use another port of this internal bus 30, which is not fetched by the DMAC 23.

Furthermore, the third embodiment describes such an example that both the request signal REQ and the acknowledge signal ACK are sent/received between the CPU 22 and the DMAC 92. The present invention is not limited to this example. For example, firstly, the CPU 22 supplies to the DMAC 92, internal bus access information for requesting accesses to the internal memory 24 and the I/O device such as the timer 25 instead of the above-explained request signal REQ and acknowledge signal ACK. As a consequence, the DMAC 92 decodes the internal bus access information to output the bus bridge control signal BST in response to the source of the DMA transfer operation requested by the CPU 22, so that the bus bridges 94 to 98 are dynamically controlled so as to switch the connections between the internal memory 24 and the I/O device such as the timer 25, and the internal buses 29/92 to perform the DMA transfer operation.

Also, in the above-explained embodiments, each of the information processing apparatuses is constituted by an one-chip microcomputer. The present invention is not limited to this structure. Alternatively, while the CPU, the DMAC, the memory, and the I/O device may be replaced by stand-alone-type devices, and also the data buses may by constituted by cables, the entire information apparatus may be arranged by way of an LAN (local area network) system.

In addition, there is a master/slave relationship between the CPU and the DMAC in the above-described embodiments. The present invention is not limited to this master/slave relationship. Alternatively, the DMAC may be replaced by the CPU so as to constitute a so-called "dual CPU structure". Also, the DMAC may be replaced by a digital signal processor (DSP) so as to achieve a parallel data process.

Moreover, the above-described embodiments employ two sets of internal buses. However, the present invention is not restricted to this bus structure. Alternatively, at least more than 2 internal buses may be provided.

As previously described in detail, in accordance with the present invention, since the first and second control means can effectively use the data buses, the operating rates of the first and second control means can be increased, so that the throughput of the overall information processing apparatus can be improved.

In accordance with the specific arrangement of this information processing apparatus, a portion of the data bus may be occupied. As a consequence, the operating rates of the first and second control means may be further increased without increasing a total number of these data buses. Therefore, the throughput of the entire information processing apparatus can be increased.

It is thus apparent that the present invention not limited to the above embodiments but may be changed and modified without departing from the scope and spirit of the invention.

Finally, the present application claims the priority of Japanese Patent Application No. Hei-365909 filed on Dec. 22, 1997, which is herein incorporated by reference.

What is claimed is:

1. An information processing apparatus comprising:

at least first and second data buses provided independently from each other;

a plurality of input/output means connected to at least one of said first and second buses, for inputting/outputting data, first control means for controlling the data input/output operations of said input/output means while occupying at least said first data bus; and second control means for requesting said first control means which controls the data input/output operations of said input/output means while occupying at least said first data bus to release said occupied first data bus, and also for controlling the data input/output operations of said input/output means while occupying said second data bus, or both said first and second data buses in response to releasing of said first data bus by said first control means.

2. An information processing apparatus according to claim 1 wherein:

said first and second data buses, said plurality of input/output means, and said first and second control means are manufactured on a single chip in the form of an one-chip microcomputer.

3. An information processing apparatus according to claim 1 wherein: priority orders are preset to the data input/output operations of said plural input/output means; and in response to said preset priority orders, said second control means requests said first control means to release at least said first data bus occupied by said first control means, and also controls the data input/output operations of said plural input/output means while occupying said second data bus in response to releasing of said first data bus by said first control means.

4. An information processing apparatus according to claim 3 wherein:

when said first control means controls the data input/output operations of said input/output means while occupying at least said first data bus, and also causes said second control means to control the data input/output operations of said input/output means while occupying at least said second data bus, said first control means supplies information related to a data input/output control to be executed in the input/output means to said second control means; and said second control means requests said first control means to release at least said first data bus based upon said supplied information, and also controls the data input/output operations of said input/output means while occupying at least said second data bus based upon releasing of said first data bus by said first control means.

5. An information processing apparatus according to claim 1 wherein:

in response to one of requests issued from the input/output means to which data is required to be inputted/outputted, a computer program, and an external source, said second control means requests said first control means to release at least said first data bus; and also controls the data input/output operations of said input/output means while occupying at least said second data bus based on releasing of said first data bus by said first control means.

6. An information processing apparatus according to claim 1 wherein:

one of said first control means and said second control means requests the other of said first control means and said second control means to release a portion of at least one of said first and second data buses; and also controls the data input/output operations of said input/output means while occupying said portion of at least one of said first and second data buses based upon releasing of said portion of at least one of said first and second data buses by the other of said first control means and said second control means.

7. An information processing apparatus according to claim 1, further comprising:

bus connecting means connected to at least said first and second data buses, whereby said plurality of input/output means are connected via said bus connecting means to any one of said first and second data buses under control of said bus connecting means by one of said first and second control means so as to input/output the data.

8. An information processing apparatus according to claim 1 wherein:

said first control means and said second control means are arranged by a CPU (central processing unit) and a DMAC (direct memory access controller).

9. An information processing apparatus according to claim 8 wherein:

said DMAC includes:
a channel control unit connected to said CPU;
a data control unit connected to said first and second data buses;
an address control unit connected to said first and second data buses; and
a DMA control register connected to said channel control unit.

10. An information processing apparatus according to claim 1 wherein:

said plurality of input/output means includes at least a timer, an A/D converter, and a serial interface.

11. An information processing apparatus according to claim 1, further comprising:

an internal memory connected to said first and second data buses, for storing the data under control of said first and second control means.

12. An information processing apparatus comprising:

at least first and second data buses provided independently from each other;
a plurality of input/output means connected to at least one of said first and second buses, for inputting/outputting data,
first control means for controlling the data input/output operations of said input/output means while occupying at least said first data bus; and
second control means for requesting said first control means to release said occupied first data bus, and also for controlling the data input/output operations of said input/output means while occupying at least said second data bus, in response to releasing of said first data bus by said first control means; wherein:

said first control means releases said first data bus requested to be released based upon the releasing request of said first data bus issued from said second control means and also an operating condition of the own first control means.

13. An information processing apparatus according to claim 12 wherein:

said first and second data buses, said plurality of input/output means, and said first and second control means are manufactured on a single chip in the form of an one-chip microcomputer.

14. An information processing apparatus according to claim 12 wherein:

priority orders are preset to the data input/output operations of said plural input/output means; and
in response to said preset priority orders, said second control means requests said first control means to release at least said first data bus occupied by said first control means, and also controls the data input/output operations of said plural input/output means while occupying said second data bus in response to releasing of said first data bus by said first control means.

15. An information processing apparatus according to claim 14 wherein:

when said first control means controls the data input/output operations of said input/output means while occupying at least said first data bus, and also causes said second control means to control the data input/output operations of said input/output means while occupying at least said second data bus, said first control means supplies information related to a data input/output control to be executed in the input/output means to said second control means; and
said second control means requests said first control means to release at least said first data bus based upon said supplied information, and also controls the data input/output operations of said input/output means while occupying at least said second data bus based upon releasing of said first data bus by said first control means.

16. An information processing apparatus according to claim 12 wherein:

in response to one of requests issued from the input/output means to which data is required to be inputted/outputted, a computer program, and an external source, said second control means requests said first control means to release at least said first data bus; and also controls the data input/output operations of said input/output means while occupying at least said second data bus based on releasing of said first data bus by said first control means.

17. An information processing apparatus according to claim 12 wherein:

one of said first control means and said second control means requests the other of said first control means and said second control means to release a portion of at least one of said first and second data buses; and also controls the data input/output operations of said input/output means while occupying said portion of at least one of said first and second data buses based upon releasing of said portion of at least one of said first and second data buses by the other of said first control means and said second control means.

18. An information processing apparatus according to claim 12, further comprising:

bus connecting means connected to at least said first and second data buses, whereby said plurality of input/ output means are connected via said bus connecting means to any one of said first and second data buses under control of said bus connecting means by one of said first and second control means so as to input/output the data.

19. An information processing apparatus according to claim 12 wherein:
said first control means and said second control means are arranged by a CPU (central processing unit) and a DMAC (direct memory access controller).

20. An information processing apparatus according to claim 19 wherein:
said DMAC includes:
a channel control unit connected to said CPU;
a data control unit connected to said first and second data buses;
an address control unit connected to said first and second data buses; and
a DMA control register connected to said channel control unit.

21. An information processing apparatus according to claim 12 wherein:
said plurality of input/output means includes at least a timer, an A/D converter, and a serial interface.

22. An information processing apparatus according to claim 12, further comprising:
an internal memory connected to said first and second data buses, for storing the data under control of said first and second control means.

23. An information processing apparatus comprising:
at least first and second internal data buses provided independently from each other;
at least one external data bus;
a plurality of internal input/output means connected to at least one of said first and second internal data buses, for inputting/outputting data;
a plurality of external input/output means connected to at least said one external data bus, for inputting/outputting data;
first control means for controlling the data input/output operations of said internal input/output means while occupying at least said first internal data bus; and
second control means for requesting said first control means which controls the data input/output operations of said internal input/output means while occupying at least said first internal data bus to release said occupied first data bus, and also for controlling the data input/output operations of said internal input/output means while occupying said second internal data bus, or both said first and second internal data buses in response to releasing of said first internal data bus by said first control means, and based upon occupation conditions of said external data bus.

24. An information processing apparatus according to claim 23 wherein:
said first and second internal data buses, said plurality of internal input/output means, said first and second control means, and at least an external bus controller are manufactured on a single chip in the form of an one-chip microcomputer.

25. An information processing apparatus according to claim 23 wherein:
priority orders are preset to the data input/output operations of said plural internal input/output means; and
in response to said preset priority orders, said second control means requests said first control means to release at least said first internal data bus occupied by said first control means, and also controls the data input/output operations of said plural internal input/output means while occupying said second internal data bus in response to releasing of said first internal data bus by said first control means.

26. An information processing apparatus according to claim 25 wherein:
when said first control means controls the data input/output operations of said internal input/output means while occupying at least said first internal data bus, and also causes said second control means to control the data input/output operations of said internal input/output means while occupying at least said second internal data bus, said first control means supplies information related to data input/output control to be executed in the internal input/output means to said second control means; and
said second control means requests said first control means to release at least said first internal data bus based upon said supplied information, and also controls the data input/output operations of said internal input/output means while occupying at least said second internal data bus based upon releasing of said first internal data bus by said first control means.

27. An information processing apparatus according to claim 23 wherein:
in response to one of requests issued from the internal and external input/output means to which data is required to be inputted/outputted, a computer program, and an external source, said second control means requests said first control means to release at least said first internal data bus; and also controls the data input/output operations of said internal input/output means while occupying at least said second data bus based on releasing of said first internal data bus by said first control means.

28. An information processing apparatus according to claim 23 wherein:
one of said first control means and said second control means requests the other of said first control means and said second control means to release a portion of at least one of said first and second internal data buses; and also controls the data input/output operations of said internal input/output means while occupying said portion of at least one of said first and second internal data buses based upon releasing of said portion of at least one of said first and second internal data buses by the other of said first control means and said second control means.

29. An information processing apparatus according to claim 23, further comprising:
bus connecting means connected to at least said first and second internal data buses, whereby said plurality of internal input/output means are connected via said bus connecting means to any one of said first and second internal data buses under control of said bus connecting means by one of said first and second control means so as to input/output the data.

30. An information processing apparatus according to claim 23 wherein:
said first control means and said second control means are arranged by a CPU (central processing unit) and a DMAC (direct memory access controller).

31. An information processing apparatus according to claim 30 wherein:
said DMAC includes:
a channel control unit connected to said CPU;
a data control unit connected to said first and second internal data buses;
an address control unit connected to said first and second internal data buses; and
a DMA control register connected to said channel control unit.

32. An information processing apparatus according to claim 23 wherein:
said plurality of internal input/output means includes at least a timer, an A/D converter, and a serial interface.

33. An information processing apparatus according to claim 23, further comprising:
an internal memory connected to said first and second internal data buses, for storing the data under control of said first and second control means.

34. An information processing apparatus comprising:
at least first and second internal data buses provided independently from each other;
at least one external data bus;
a plurality of internal input/output means connected to at least one of said first and second internal data buses, for inputting/outputting data;
a plurality of external input/output means connected to at least said one external data bus, for inputting/outputting data;
first control means for controlling the data input/output operations of said internal input/output means while occupying at least said first internal data bus;
second control means for requesting said first control means to release said occupied first internal data bus, and also for controlling the data input/output operations of said input/output means while occupying said second internal data bus in response to releasing of said first internal data bus by said first control means, and based upon occupation conditions of said external data bus; wherein:
said first control means releases said first internal data bus requested to be released based upon the releasing request from said second control means and also an operating condition of the own first control means.

35. An information processing apparatus according to claim 34 wherein:
the occupation conditions of said first/second internal data buses and of said external data bus by said first control means is constituted by:
a first occupation condition where neither said first/second internal data buses, nor said external data buses is released;
a second occupation condition where any one of said first/second internal data buses is released;
a third occupation condition where both said first/second internal data buses are released;
a fourth occupation condition where only said external data bus is released; and also
a fifth occupation condition where any one of said external data bus and of said first/second data buses is released; and wherein:
said second control means requests said first control means to transfer a present data-bus-occupation condition by said first control means into another data-bus-occupation condition defined in said first to fifth occupation conditions in response to the data input/output control mode by said internal input/output means; and also controls the data input/output operations of said input/output means under said transferred data-bus-occupation condition based upon transferring of the present data-bus-occupation condition requested by said first control means.

36. An information processing apparatus according to claim 34 wherein:
said first and second internal data buses, said plurality of internal input/output means, said first and second control means, and at least an external bus controller are manufactured on a single chip in the form of an one-chip microcomputer.

37. An information processing apparatus according to claim 34 wherein:
priority orders are preset to the data input/output operations of said plural internal input/output means; and
in response to said preset priority orders, said second control means requests said first control means to release at least said first internal data bus occupied by said first control means, and also controls the data input/output operations of said plural internal input/output means while occupying said second internal data bus in response to releasing of said first internal data bus by said first control means.

38. An information processing apparatus according to claim 37 wherein:
when said first control means controls the data input/output operations of said internal input/output means while occupying at least said first internal data bus, and also causes said second control means to control the data input/output operations of said internal input/output means while occupying at least said second internal data bus, said first control means supplies information related to a data input/output control tobe executed in the internal input/output means to said second control means; and
said second control means requests said first control means to release at least said first internal data bus based upon said supplied information, and also controls the data input/output operations of said internal input/output means while occupying at least said second internal data bus based upon releasing of said first internal data bus by said first control means.

39. An information processing apparatus according to claim 34 wherein:
in response to one of requests issued from the internal and external input/output means to which data is required to be inputted/outputted, a computer program, and an external source, said second control means requests said first control means to release at least said first internal data bus; and also controls the data input/output operations of said internal input/output means while occupying at least said second data bus based on releasing of said first internal data bus by said first control means.

40. An information processing apparatus according to claim 34 wherein:
one of said first control means and said second control means requests the other of said first control means and said second control means to release a portion of at least one of said first and second internal data buses; and also controls the data input/output operations of said internal input/output means while occupying said portion of at least one of said first and second internal data buses based upon releasing of said portion of at least one of said first and second internal data buses by the other of said first control means and said second control means.

41. An information processing apparatus according to claim 34, further comprising:

bus connecting means connected to at least said first and second internal data buses, whereby said plurality of internal input/output means are connected via said bus connecting means to any one of said first and second internal data buses under control of said bus connecting means by one of said first and second control means so as to input/output the data.

42. An information processing apparatus according to claim 34 wherein:

said first control means and said second control means are arranged by a CPU (central processing unit) and a DMAC (direct memory access controller).

43. An information processing apparatus according to claim 42 wherein:

said DMAC includes:
 a channel control unit connected to said CPU;
 a data control unit connected to said first and second internal data buses;
 an address control unit connected to said first and second internal data buses; and
 a DMA control register connected to said channel control unit.

44. An information processing apparatus according to claim 34 wherein:

said plurality of internal input/output means includes at least a timer, an A/D converter, and a serial interface.

45. An information processing apparatus according to claim 34, further comprising:

an internal memory connected to said first and second internal data buses, for storing the data under control of said first and second control means.

46. An information processing method comprising:

a first control step for controlling data input/output operations executed by a plurality of input/output means under control of first control means, connected to at least one of first and second data buses while occupying at least said first data bus;

a second control step for requesting said first control means to release said second data bus under control of second control means, which is not occupied in said first control step where the data input/output operations by said plural input/output means are controlled while occupying said first data bus;

a third control step for judging as to whether or not said second control means releases said second data bus not occupied by the own second control means based upon said request and operating conditions of the own second control means, and thereafter for notifying the judgment result to said first control means; and a fourth control step for controlling the data input/output operations of said plural input/output means under control of said first control means based on said notification issued from said second control means while occupying said second data bus not occupied by the second control means.

* * * * *